US012166439B2

(12) United States Patent
Mori et al.

(10) Patent No.: US 12,166,439 B2
(45) Date of Patent: Dec. 10, 2024

(54) ROTARY ELECTRIC MACHINE APPARATUS

(71) Applicant: Mitsubishi Electric Corporation, Tokyo (JP)

(72) Inventors: Tatsuya Mori, Tokyo (JP); Kenta Kubo, Tokyo (JP); Yu Hirotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 17/796,789

(22) PCT Filed: Mar. 2, 2020

(86) PCT No.: PCT/JP2020/008593
§ 371 (c)(1),
(2) Date: Aug. 1, 2022

(87) PCT Pub. No.: WO2021/176493
PCT Pub. Date: Sep. 10, 2021

(65) Prior Publication Data
US 2023/0048207 A1    Feb. 16, 2023

(51) Int. Cl.
*H02P 21/22* (2016.01)
*H02K 1/27* (2022.01)
(Continued)

(52) U.S. Cl.
CPC ............. *H02P 21/22* (2016.02); *H02K 1/27* (2013.01); *H02K 21/12* (2013.01); *H02P 6/10* (2013.01); *H02P 27/06* (2013.01)

(58) Field of Classification Search
CPC . H02P 21/22; H02P 6/10; H02P 27/06; H02K 1/27; H02K 21/12
See application file for complete search history.

(56) References Cited

U.S. PATENT DOCUMENTS

2015/0357892 A1    12/2015 Nakano et al.
2021/0328537 A1*   10/2021 Iwaji ................. B60L 3/00
(Continued)

FOREIGN PATENT DOCUMENTS

JP    2000-308286 A    11/2000
JP    2015-73396    *   4/2015
(Continued)

OTHER PUBLICATIONS

Translaiton of JP-2015-73396.*
(Continued)

*Primary Examiner* — Zoheb S Imtiaz
(74) *Attorney, Agent, or Firm* — Sughrue Mion, PLLC; Richard C. Turner

(57) ABSTRACT

To provide a rotary electric machine apparatus which can perform current control which reduces a torque ripple component effectively, using a rotary electric machine in which the permanent magnet of the rotor has the skew structure which shifts the magnetic pole position in the circumferential direction at each position in the axial direction. When defining, as the current vector of most advanced phase, a current vector of current command values calculated on the dq-axis rotating coordinate system of most advanced phase, and defining, as the current vector of middle phase, a current vector of current command values calculated on the dq-axis rotating coordinate system of middle phase, the rotary electric machine apparatus brings a controlling current vector close to the current vector of most advanced phase from the current vector of middle phase, as the winding currents increase.

11 Claims, 22 Drawing Sheets

(51) Int. Cl.
H02K 21/12 (2006.01)
H02P 6/10 (2006.01)
H02P 27/06 (2006.01)

(56) References Cited

U.S. PATENT DOCUMENTS

2022/0209702 A1* 6/2022 Matsuo .................. H02P 21/22
2022/0329186 A1* 10/2022 Murray ............... H02P 21/0003

FOREIGN PATENT DOCUMENTS

| JP | 2015-73396 A | 4/2015 |
| JP | 2019-115114 A | 7/2019 |
| WO | 2014/174572 A1 | 10/2014 |

OTHER PUBLICATIONS

International Search Report for PCT/JP2020/008593 dated, Apr. 14, 2020 (PCT/ISA/210).
Extended European Search Report dated Mar. 16, 2023 in Application No. 20923445.9.
Office Action dated Jan. 10, 2023 from the Japanese Patent Office in JP Application No. 2022-504754.

* cited by examiner

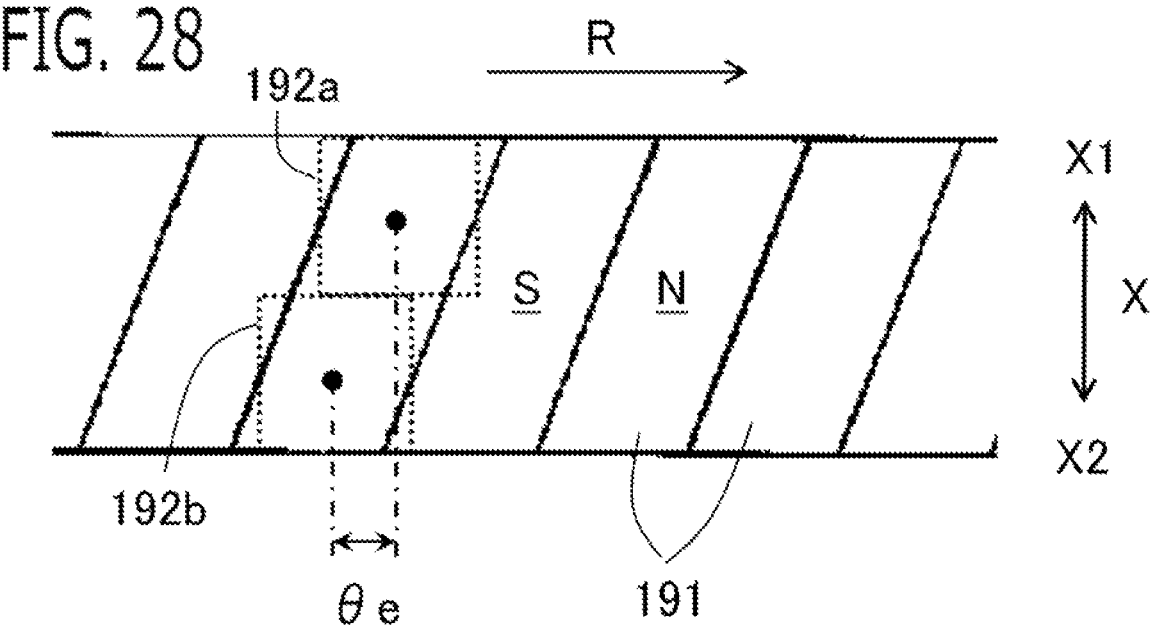

ROTARY ELECTRIC MACHINE APPARATUS

CROSS REFERENCE TO RELATED APPLICATIONS

This application is a National Stage of International Application No. PCT/JP2020/008593 filed Mar. 2, 2020.

TECHNICAL FIELD

The present disclosure relates to a rotary electric machine apparatus.

BACKGROUND ART

As the motor for variable speed, the DC motor which receives supply of DC voltage, generates torque and rotates became popular. However, the DC motor has a problem in maintenance due to abrasion of the brush fundamentally. Moreover, since the inverter which can generate the voltages of variable amplitude and variable frequency became popular, the AC motor becomes popular as the motor for variable speed. As the AC motor, the induction motor became popular first, especially its rotor consists of core and short circuit ring (secondary conductor), and the cage type induction motor which has the cage shape becomes popular. Recently the permanent magnet synchronous motor which uses the permanent magnet also becomes popular.

The induction motor and the permanent magnet synchronous motor which become popular as the AC motor are controlled by technology called "vector control" in many cases. In this vector control, current is controlled on the dq-axis rotating coordinate system which rotates synchronizing with the rotor of the AC motor. Accordingly, in the vector control, the torque of the AC motor is controlled by controlling the q-axis current which is the q-axis component of the current vector, and the torque response equivalent to the DC motor is realized.

There is the case where the rotor of the AC motor has a skew structure. The purpose of having the skew structure is to reduce the torque ripple component generated by the AC motor (the cogging torque is also included in the torque ripple component in the permanent magnet synchronous motor). First, in the cage type induction motor, the skew structure is configured so that the position in the circumferential direction of the short circuit ring (secondary conductor) of the rotor shifts continuously at each position in the axial direction. On the other hand, in the permanent magnet synchronous motor, as shown in FIG. 2 and FIG. 5 of patent document 1, the permanent magnet of the rotor has the skew structure in which the magnetic pole position in the circumferential direction is shifted step wisely or continuously at each position in the axial direction.

Next, the vector control in the AC motor which has the skew structure is described. The cage type induction motor does not depend on whether or not the skew structure is provided. This is because, in the induction motor, fundamentally, the magnetic flux is generated in the rotor by energizing current to the stator coil, and the magnetic flux direction of the rotor can be generated by energizing current in the direction where the controller intends.

CITATION LIST

Patent Literature

Patent document 1: JP 2000-308286 A

SUMMARY OF INVENTION

Technical Problem

However, in the permanent magnet synchronous motor, the magnetic flux of the rotor is determined by the magnetic pole of the rotor. Accordingly, the direction of the magnetic flux of the rotor cannot be freely changed by the controller. If the permanent magnet of the rotor of the permanent magnet synchronous motor does not have the skew structure, since the position of the circumferential direction of the magnetic pole is the same at each position in the axial direction, the direction of its magnetic pole position may be defined as the d-axis, and the vector control may be performed.

However, if the permanent magnet of the rotor of the permanent magnet synchronous motor has the skew structure, the position in the circumferential direction of the magnetic pole changes at each position in the axial direction. Accordingly, when the current control is performed by the dq-axis rotating coordinate system, it becomes a problem how the magnetic pole position corresponding to the d-axis is set. Especially, although the skew structure is provided in order to reduce the torque ripple component, it is not disclosed yet how the magnetic pole position corresponding to the d-axis is set and the vector control is performed in order to reduce the torque ripple component effectively.

Then, the purpose of the present disclosure is to provide a rotary electric machine apparatus which can perform current control which reduces a torque ripple component effectively, using a rotary electric machine in which the permanent magnet of the rotor has the skew structure which shifts the magnetic pole position in the circumferential direction at each position in the axial direction.

Solution to Problem

A rotary electric machine apparatus according to the present disclosure, including:
  a rotary electric machine that is provided with a rotor having permanent magnets, and a stator having plural-phase windings;
  an inverter that converts DC power supplied from a DC power source and AC power supplied to the plural-phase windings, and is provided with a plurality of switching devices;
  a current detection unit that detects currents which flow into the plural-phase windings;
  a rotation detection unit that detects a rotational angle of the rotor;
  a current control unit that sets a magnetic pole position for control based on a detection value of the rotational angle, calculates current command values for control, and calculates voltage command values based on detection values of the currents, the current command values for control, and the magnetic pole position for control; and
  a switching control unit that controls on/off the plurality of switching devices based on the voltage command values,
  wherein the permanent magnets have a skew structure in which the magnetic pole positions are shifted in the circumferential direction at each position in an axial direction,
  wherein when defining, as a current vector of most advanced phase, a current vector of the current command values calculated on a dq-axis rotating coordinate system of most advanced phase which consists of a d-axis defined in a direction of the magnetic pole position whose phase is most advanced in a rotation direction among the magnetic pole positions of respective positions in the axial direction, and a q-axis defined in a direction advanced to this d-axis by 90 degrees in an electrical angle, and defining, as a current vector of middle phase, a current vector of the current command values calculated on a dq-axis rotating coordinate system of middle phase which consists of a d-axis defined in a direction of a middle phase between the magnetic pole position whose phase is most advanced and the magnetic pole position whose phase is most delayed in the rotation direction among the magnetic pole positions of respective positions in the axial direction, and a q-axis defined in a direction advanced to this d-axis by 90 degrees in an electrical angle, the current control unit brings a controlling current vector close to the current vector of most advanced phase from the current vector of middle phase, as winding currents flowing into the plurality of windings increase.

Advantage of Invention

If the d-axis current which expressed the winding currents at the dq-axis rotating coordinate system of most advanced phase increases in the positive direction, the magnetic saturation occurs in the stator part which opposes to the magnetic pole position of the most advanced phase and the interlinkage flux of d-axis increases, but its inclination decreases. If this magnetic saturation occurs, the torque ripple component increases. Accordingly, when the winding currents are large, it is necessary to bring the controlling current vector close to the current vector of most advanced phase, in order to suppress that the d-axis current of the most advanced phase increases in the positive direction. On the other hand, when the winding currents are small, since the influence of magnetic saturation is small, if the controlling current vector is brought close to the current vector of middle phase, the torque ripple component generated by the magnetic pole of the most advanced phase and the torque ripple component generated by the magnetic pole of the most delayed phase can be canceled with each other, and the torque ripple component can be reduced.

According to the rotary electric machine apparatus of the present disclosure, the controlling current vector is brought close to the current vector of most advanced phase from the current vector of middle phase, as the winding currents increase. When the winding currents are small, the torque ripple component generated by the magnetic pole of the most advanced phase and the torque ripple component generated by the magnetic pole of the most delayed phase are canceled with each other, and the torque ripple component can be reduced. And, even when the winding currents increase, the d-axis current of the most advanced phase can be suppressed from increasing until the magnetic saturation occurs, and the torque ripple component can be reduced. Accordingly, the phase of the current vector with respect to the magnetic pole position which is shifted in the circumferential direction is changed appropriately according to increase and decrease in the winding currents, and the torque ripple component can be reduced effectively.

BRIEF DESCRIPTION OF THE DRAWINGS

FIG. 28 is an expansion plan of the rotor according to other embodiments.

DETAILED DESCRIPTION OF THE EMBODIMENTS

1. Embodiment 1

Figure 1:
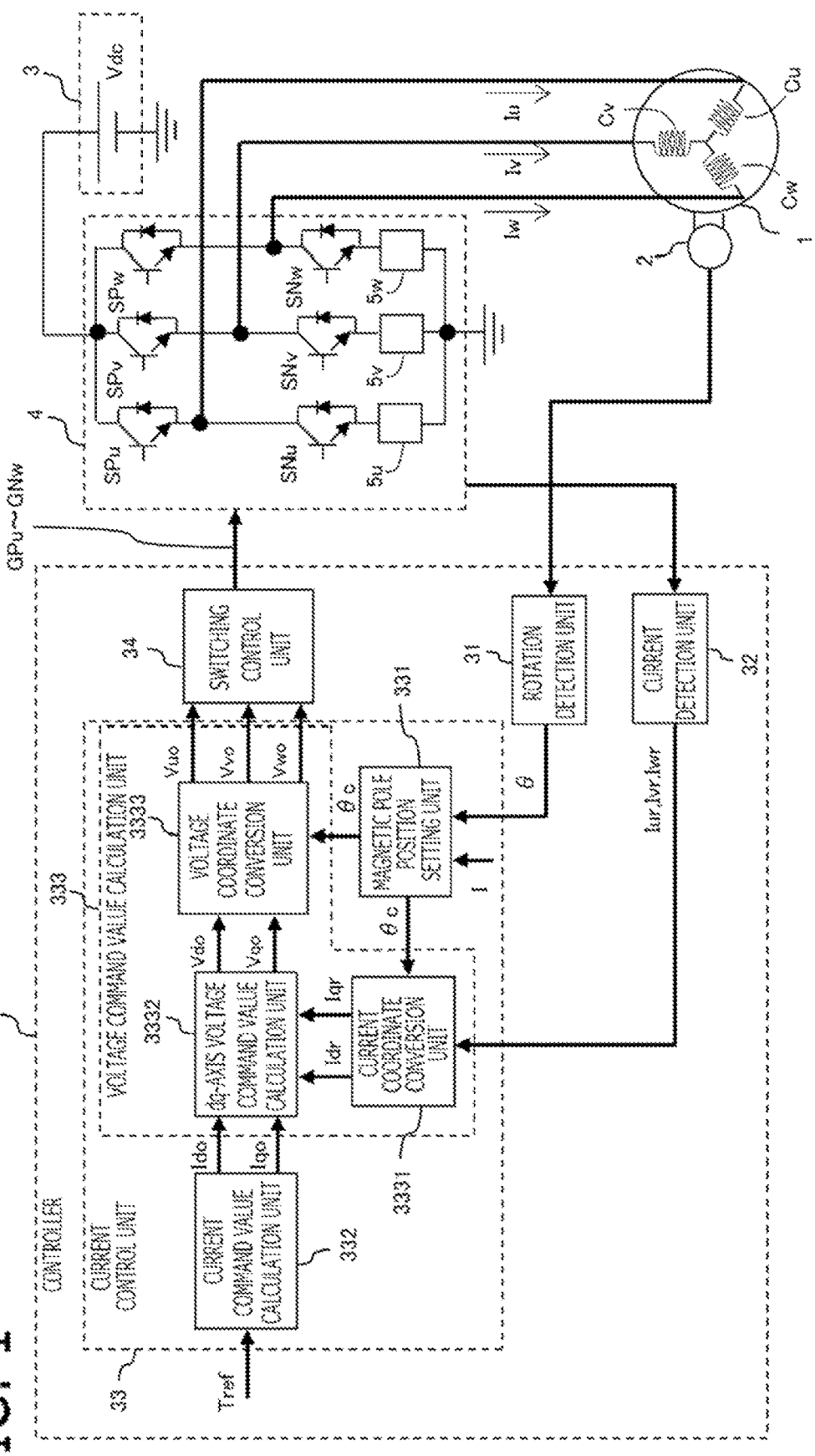
FIG. 1 is a schematic configuration diagram of the AC rotary machine apparatus according to Embodiment 1.

A rotary electric machine apparatus according to Embodiment 1 will be explained with reference to drawings. FIG. 1 is a schematic configuration diagram of the rotary electric machine apparatus according to the present embodiment. The rotary electric machine apparatus is provided with a rotary electric machine 1, an inverter 4, and a controller 6.

1-1. Rotary Electric Machine 1

The rotary electric machine 1 is a permanent magnet synchronous motor which is provided with a rotor 11 having permanent magnets 111, and a stator 21 having plural-phase windings. As the plural-phase windings, three-phase windings Cu, Cv, Cw of U phase, V phase, and W phase are provided. The three-phase windings may be connected by star connection, or may be connected by Δ connection.

The rotor 11 is provided with a rotation detector 2 for detecting a rotational angle of the rotor 11. Resolver, encoder, or MR sensor is used for the rotation detector 2. An output signal of the rotation detector 2 is inputted into the controller 6.

Figure 2:
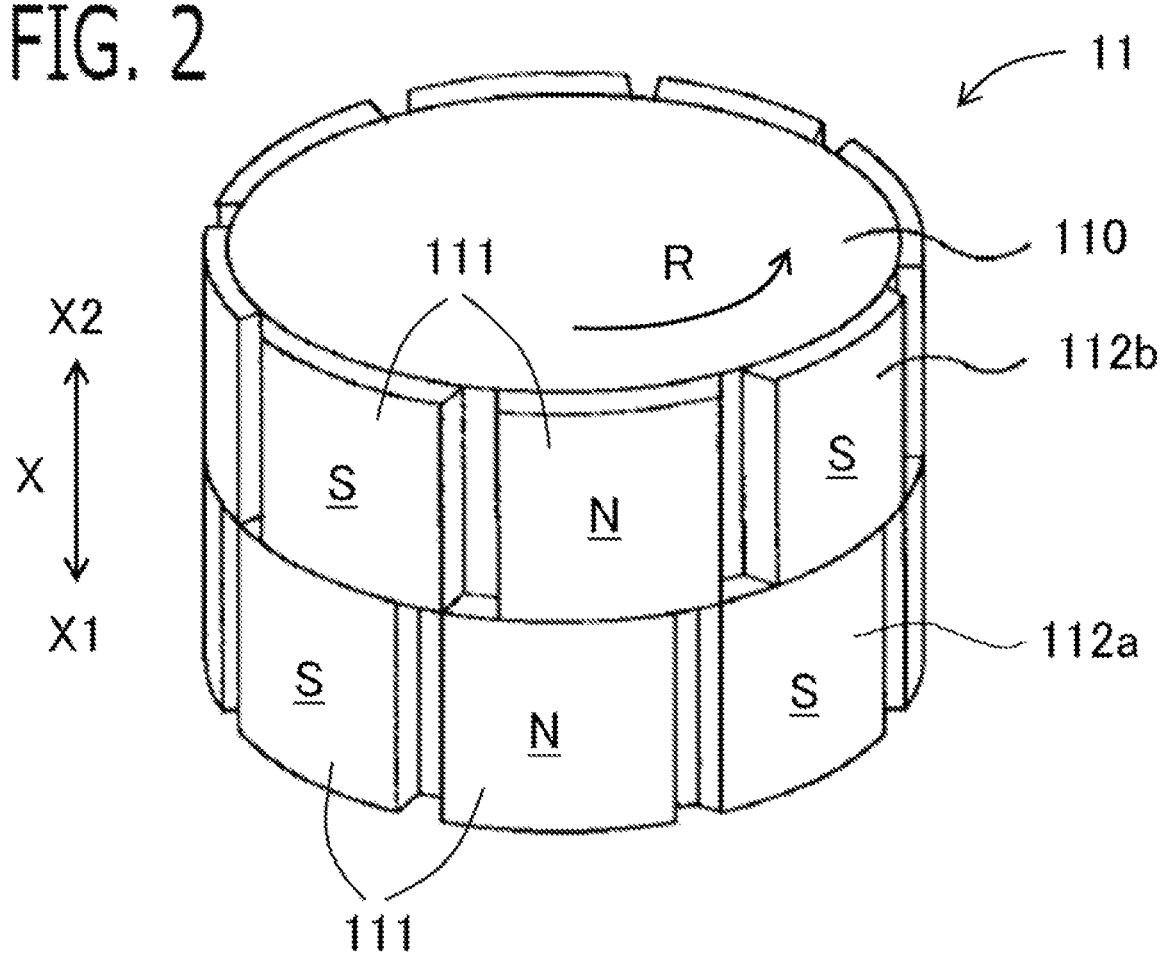
FIG. 2 is a perspective view of the rotor according to Embodiment 1.

As shown in FIG. 2, the permanent magnets 111 are provided on the surface of the rotor 11, and is a surface magnet type synchronous motor. The rotor 11 is provided with a rotor core 110 of cylindrical columnar, and the permanent magnets 111 are stuck on the outer circumferential face of the rotor core 110.

<Skew Structure>

Figure 3:
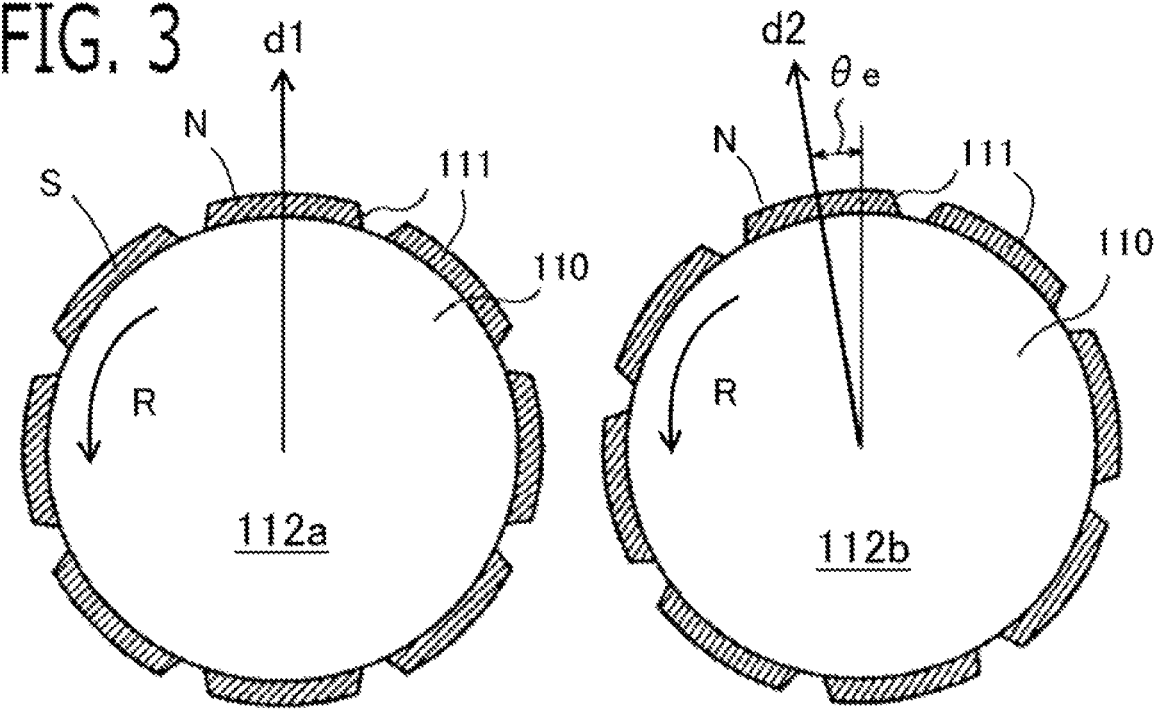
FIG. 3 is a cross-sectional view of the rotor according to Embodiment 1.

The permanent magnets 11 have a skew structure in which the magnetic pole positions are shifted in the circumferential direction at each position in the axial direction X. In the present embodiment, as shown in FIG. 2 and FIG. 3, the permanent magnets 11 have the skew structure in which the magnetic pole positions are shifted in the circumferential direction in two steps in the axial direction X. A first skew step 112a is provided in the axial direction one side X1 of the rotor 11, and a second skew step 112b is provided in the axial direction the other side X2. FIG. 2 is a perspective view of the rotor 11, the left side of FIG. 3 is a cross-sectional view of the first skew step 112a, and the right side of FIG. 3 is a cross-sectional view of the second skew step 112b. In peripheral part of each of the first and the second skew steps 112a, 112b, eight magnetic poles 111 (four N poles and four S poles) are disposed at equal intervals in the circumferential direction. The N pole and the S pole are disposed alternately in the circumferential direction.

The magnetic poles 111 (for example, N poles) of the second skew step 112b and the magnetic poles 111 (for example, N poles) of the first skew step 112a are shifted in the circumferential direction with each other. In this example, the magnetic poles 111 of the second skew step 112b are shifted by 30 degrees in the rotation direction R in the electrical angle with respect to the magnetic poles 111 of the first skew step 112a, and are shifted 7.5 degrees in the mechanical angle. Accordingly, in the present embodiment, a skew angle θe which is a shift angle in the circumferential direction of the magnetic pole positions is 30 degrees in the electrical angle, and is 7.5 degrees in the mechanical angle. The electrical angle becomes an angle obtained by multiplying the number of pole pairs (in this example, 4) to the mechanical angle. The number of pole pairs becomes ½ of the pole number.

Figure 4:
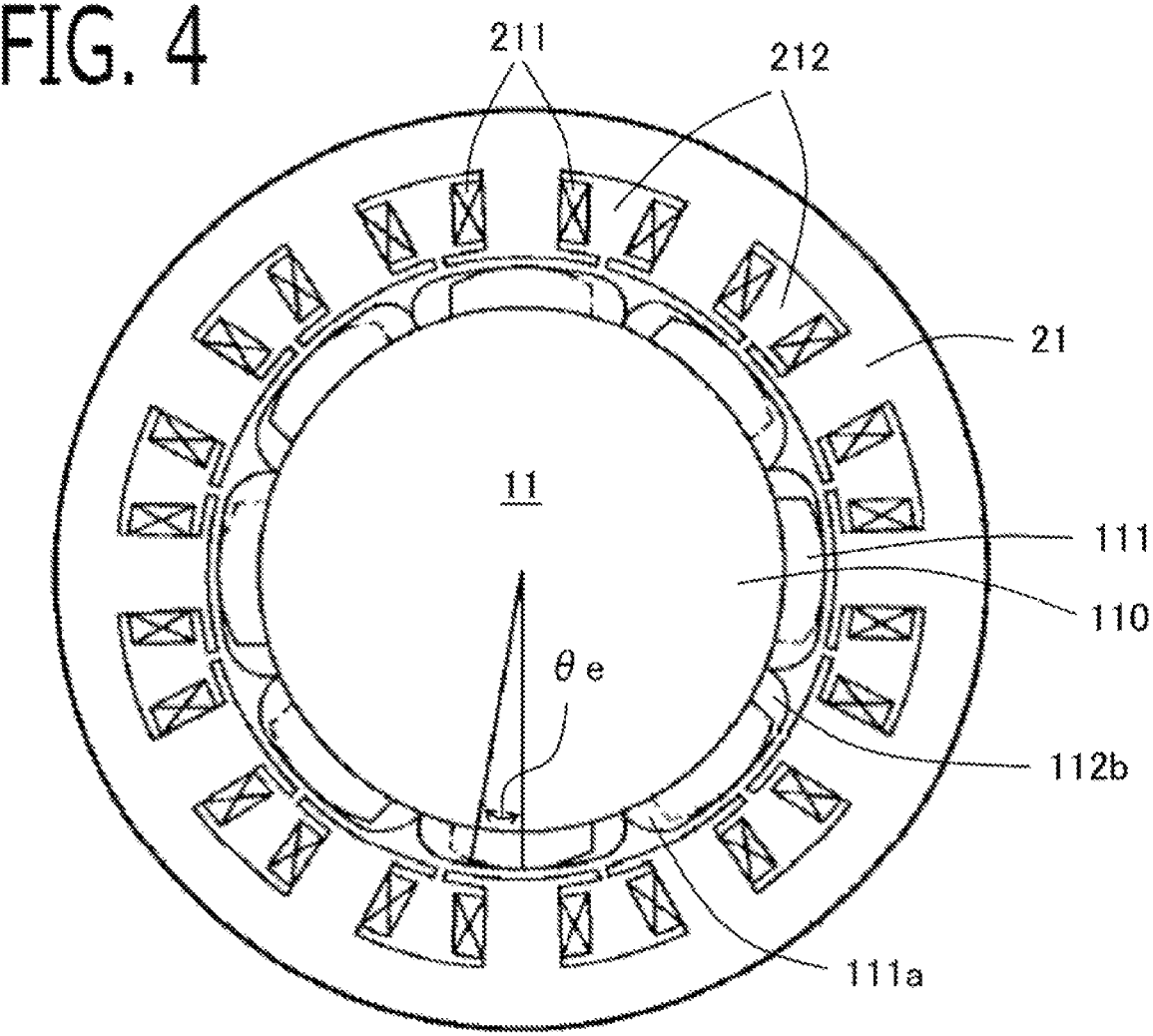
FIG. 4 is a cross-sectional view of the rotor and the stator according to Embodiment 1.

FIG. 4 is a cross-sectional view of the rotor 11 and the stator 21. The number of slots 212 of the stator around which the three-phase windings 211 are wound is 12. Accordingly, the rotary electric machine 1 is the surface magnet type permanent magnet synchronous motor of the pole number of 8 and the slot number of 12.

1-2. Inverter 4

The inverter 4 is an electric power converter which converts DC power supplied from a DC power source 3 and AC power supplied to the three-phase windings, and is provided with a plurality of switching devices. The inverter 4 is provided with three sets of series circuits (leg) in each of which a positive electrode side switching device SP connected to a positive electrode side of the DC power source 3 and a negative electrode side switching device SN connected to a negative electrode side of the DC power source 3 are connected in series, corresponding to respective phase of three-phase. A connection node of two switching devices in the series circuit of each phase is connected to the winding of the corresponding phase.

Specifically, in the series circuit of U phase, the positive electrode side switching device SPu of U phase and the negative electrode side switching device SNu of U phase are connected in series, and the connection node of two switching devices is connected to the winding Cu of U phase. In the series circuit of V phase, the positive electrode side switching device SPv of V phase and the negative electrode side switching device SNv of V phase are connected in series, and the connection node of two switching devices is connected to the winding Cv of V phase. In the series circuit of W phase, the positive electrode side switching device SPw of W phase and the negative electrode side switching device SNw of W phase are connected in series, and the connection node of two switching devices is connected to the winding Cw of W phase.

IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 6 via a gate drive circuit and the like. The each switching device is turned on or turned off by the switching signals GPu to GNw outputted from the controller 6.

The DC power source 3 outputs a power source voltage Vdc to the inverter 4. The DC power source 3 may be any apparatus which outputs power source voltage Vdc, such as a battery, a DC-DC converter, a diode rectifier, and a PWM rectifier. A voltage sensor which detects the power source voltage Vdc may be provided in the DC power source 3. And, an output signal of the voltage sensor may be inputted into the controller 6. The controller 6 may control using the detected power source voltage Vdc.

The current detector 5 is a circuit which detects currents which flow into the three-phase windings. In the present embodiment, the current detector 5 is provided in the series circuit of two switching devices of each phase of three-phase. The current detector 5 is provided with shunt resistances 5u, 5v, 5w connected in series to the negative electrode side of the negative electrode side switching device of each phase. The shunt resistance 5u of U phase is connected in series to the negative electrode side of the negative electrode side switching device SNu of U phase, the shunt resistance 5v of V phase is connected in series to the negative electrode side of the negative electrode side switching device SNv of V phase, and the shunt resistance 5w of W phase is connected in series to the negative electrode side of the negative electrode side switching device SNw of W phase. The both-ends potential difference of the shunt resistance 5u, 5v, 5w of each phase is inputted into the controller 6. The current detector 5 may be provided on the wire which connects the series circuit of two switching devices of each phase, and the winding of each phase. The current detector 5 may detect the currents of any two phases. In this case, by utilizing that a total value of the winding currents of three-phase Iu, Iv, Iw becomes 0, the controller 6 may calculate the current of one remaining phase, based on the current detection values of two phases. For example, the current detector 5 may detect the currents Iur, Ivr of U phase and V phase, and the controller 6 may calculate the current Iwr of W phase by Iwr=−Iur−Ivr.

1-3. Controller 6

Figure 5:
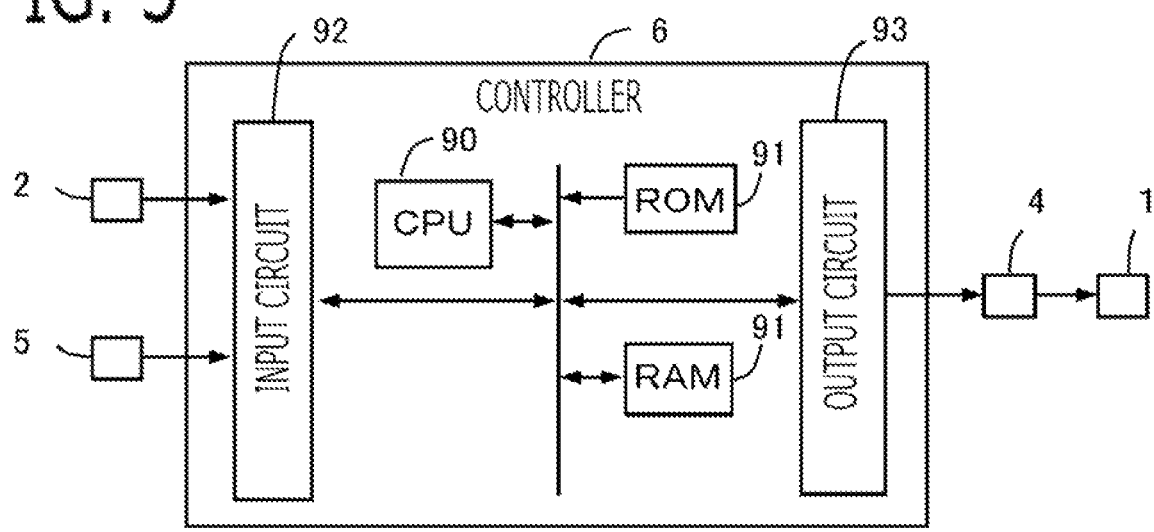
FIG. 5 is a hardware configuration diagram of the controller according to Embodiment 1.

The controller 6 controls the rotary electric machine 1 via the inverter 4. As shown in FIG. 1, the controller 6 is provided with a rotation detection unit 31, a current detection unit 32, a current control unit 33, a switching control unit 34, and the like. Each function of the controller 6 is realized by processing circuits provided in the controller 6. Specifically, as shown in FIG. 5, the controller 6 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. The input circuit 92 is connected with various kinds of sensors and switches such as the rotation detector 2 and the current detector 5, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM, and collaborates with other hardware devices in the controller 6, such as the storage apparatus 91, the input circuit 92, and the output circuit 93, so that the respective functions of the control units 31 to 34 of FIG. 1 provided in the controller 6 are realized. Various kinds of setting data items to be utilized in the control units 31 to 34 are stored, as part of software items (programs), in the storage apparatus 91 such as ROM. Each function of the controller 6 will be explained in detail below.

The rotation detection unit 31 detects a rotational angle and a rotational angle speed of the rotor in the electrical angle. In the present embodiment, the rotation detection unit 31 detects the rotational angle $\theta$ and the rotational angle speed $\omega$ of the rotor based on the output signal of the rotation detector 2.

The current detection unit 32 detects the currents Iur, Ivr, Iwr which flow into the three-phase windings, based on the output signal of the current detector 5. In the present embodiment, the current detection unit 32 divides the potential difference between both ends of the shunt resistance of each phase by a resistance value of shunt resistance, and detects the current Iur, Ivr, Iwr of the winding of each phase.

In the present embodiment, the current control unit 33 is provided with a magnetic pole position setting unit 331, a current command value calculation unit 332, and a voltage command value calculation unit 333. The magnetic pole position setting unit 331 sets a magnetic pole position for control $\theta c$, based on the rotational angle $\theta$ detected by the rotation detection unit 31. The current command value calculation unit 332 calculates current command values for control. The voltage command value calculation unit 333 calculates voltage command values based on the detection values of currents, the current command values for control, and the magnetic pole position for control $\theta c$.

<Current Control on Dq-Axis Rotating Coordinate System>

The current control unit 33 controls currents on a dq-axis rotating coordinate system. The dq-axis rotating coordinate system consists of a d-axis defined in a rotational angle direction of the magnetic pole position (N pole position), and a q-axis defined in a direction advanced to the d-axis by 90 degrees in an electrical angle.

As explained using FIG. 3, the magnetic pole position of the second skew step 112b is advanced to the magnetic pole position of the first skew step 112a by the skew angle $\theta e$ (in this example, 30 degrees) in the rotation direction R in the electrical angle. Accordingly, it becomes a problem how the magnetic pole position of the dq-axis rotating coordinate system is set.

Figure 6:
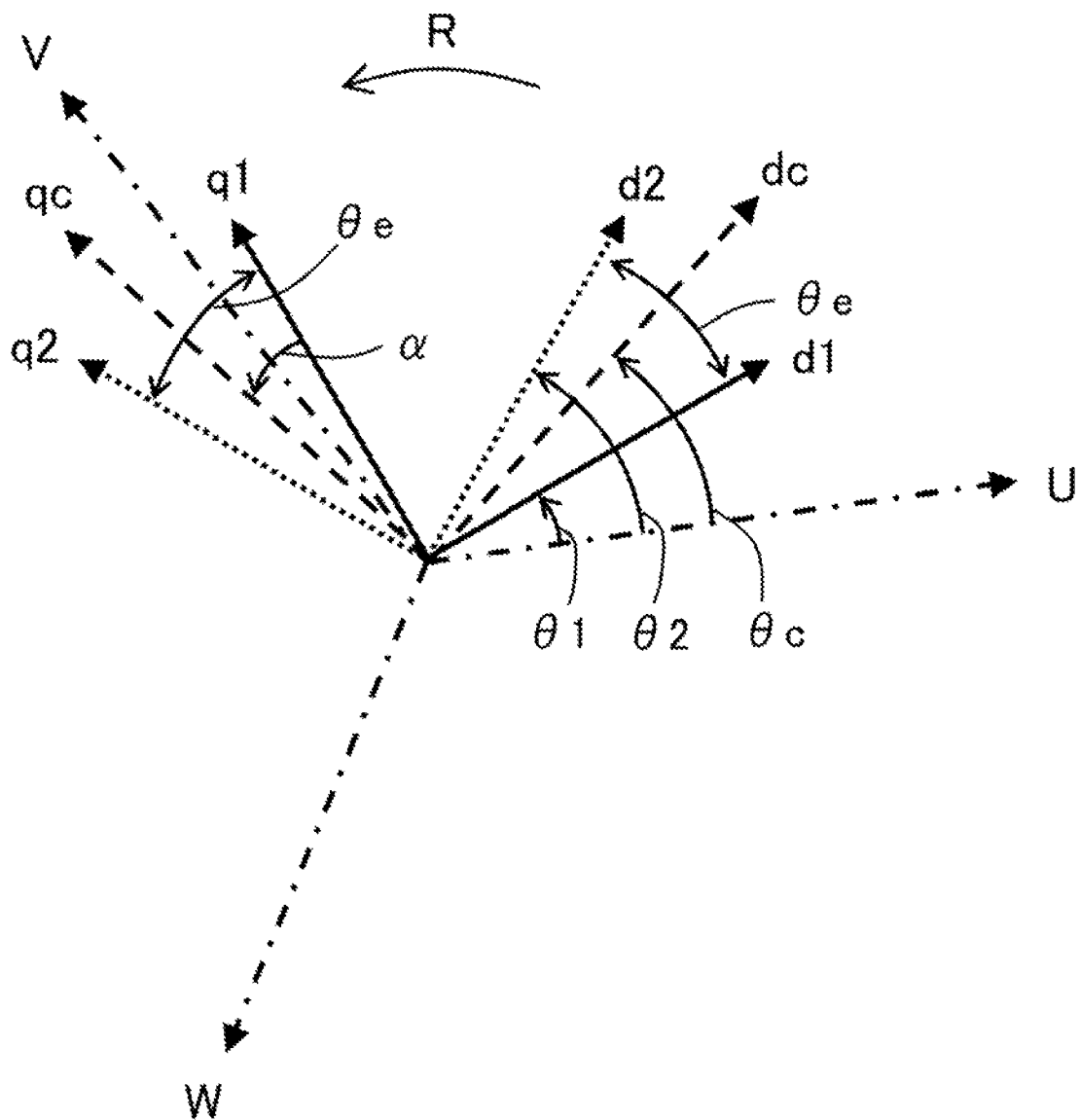
FIG. 6 is a figure explaining the coordinate system according to Embodiment 1.

For example, as shown in FIG. 6, a dq-axis rotating coordinate system of most advanced phase, which is set on the basis of the magnetic pole position $\theta 2$ of the second skew step 112b whose phase is most advanced in the rotation direction R, consists of a d-axis (hereinafter, referred to as d2-axis) defined in the magnetic pole position $\theta 2$ direction of the second skew step 112b, and a q-axis (hereinafter, referred to as q2-axis) defined in a direction advanced to the d2-axis by 90 degrees in the electrical angle.

A dq-axis rotating coordinate system of most delayed phase, which is set on the basis of the magnetic pole position $\theta 1$ of the first skew step 112a whose phase is most delayed in the rotation direction R, consists of a d-axis (hereinafter, referred to as d1-axis) defined in the magnetic pole position $\theta 1$ direction of the first skew step 112a, and a q-axis (hereinafter, referred to as q1-axis) defined in a direction advanced to the d1-axis by 90 degrees in the electrical angle.

A dq-axis rotating coordinate system for control, which is set on the basis of the magnetic pole position for control $\theta c$, consists of a d-axis (hereinafter, referred to as dc-axis) defined in the magnetic pole position for control $\theta c$ direction, and a q-axis (hereinafter, referred to as qc-axis) defined in a direction advanced to the dc-axis by 90 degrees in the electrical angle.

Each magnetic pole position $\theta 2$, $\theta 1$, $\theta c$ is a rotational angle of the magnetic pole in the electrical angle on the basis of U axis (position of the U phase winding) of a three-phase stationary coordinate axes (U axis, V axis, W axis) which are set to positions of the three-phase windings.

<Change of Sixth-Order Torque Ripple Component by Phase of Magnetic Pole Position for Control $\theta c$>

In the present embodiment, as described later, the current command values are calculated by Id=0 control. A current command value of d-axis Ido is set to 0 (Ido=0), and a current command value of q-axis Iqo is set to a value according to a torque command value Tref. Accordingly, a current vector coincides with the qc-axis of the dq-axis rotating coordinate system for control.

Figure 7:
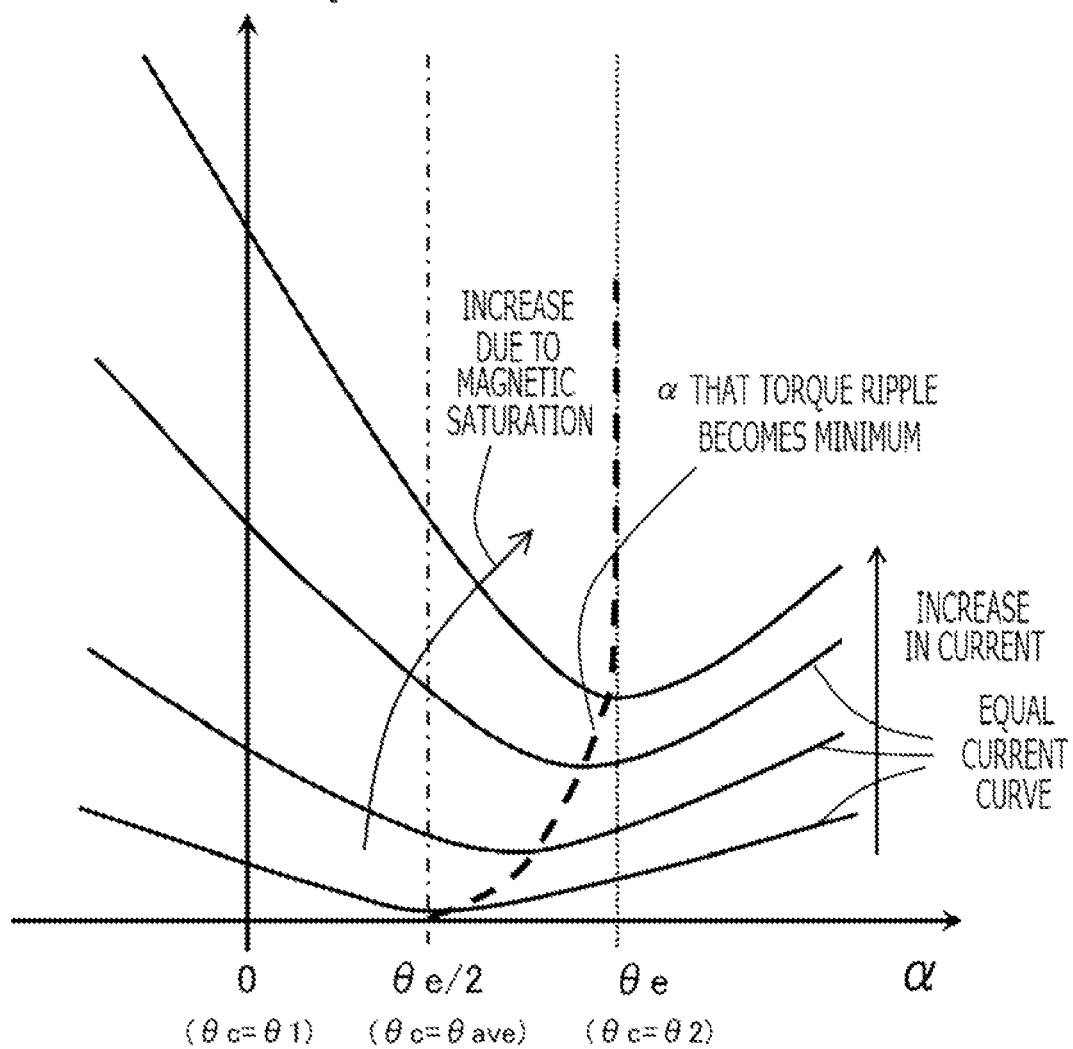
FIG. 7 is a characteristics figure of the torque ripple according to Embodiment 1.

FIG. 7 shows an example of characteristics figure between a phase advance α (=θc−θ1) of the magnetic pole position for control θc with respect to the magnetic pole position θ1 of the most delayed phase, and a sixth-order torque ripple component in the electrical angle. FIG. 7 shows characteristics (equal current curve) at each of four current vectors whose absolute values are different. In the case of α=0, the magnetic pole position for control θc coincides with the magnetic pole position θ1 of the most delayed phase, and the direction of the current vector coincides with the direction of the q1-axis. In the case of α=θe, the magnetic pole position for control θc coincides with the magnetic pole position θ2 of the most advance phase, and the direction of the current vector coincides with the direction of the q2-axis. In the case of α=θe/2, the magnetic pole position for control θc coincides with a magnetic pole position θave of a middle phase between the magnetic pole position θ2 of the most advanced phase and the magnetic pole position θ1 of the most delayed phase, and the direction of the current vector coincides with a middle phase direction between the q2-axis and the q1-axis.

If the absolute value of the current vector is small, the phase advance α that the sixth-order torque ripple component becomes the smallest is the skew angle θe/2. At α=θe/2, the magnetic pole position for control θc becomes the middle phase between the magnetic pole position θ2 of the most advanced phase and the magnetic pole position θ1 of the most delayed phase. This is because, at the middle phase, the sixth-order torque ripple component caused by the magnetic pole of the second skew step 112b, and the sixth-order torque ripple component caused by the magnetic pole of the first skew step 112a are canceled with each other.

Figure 8:
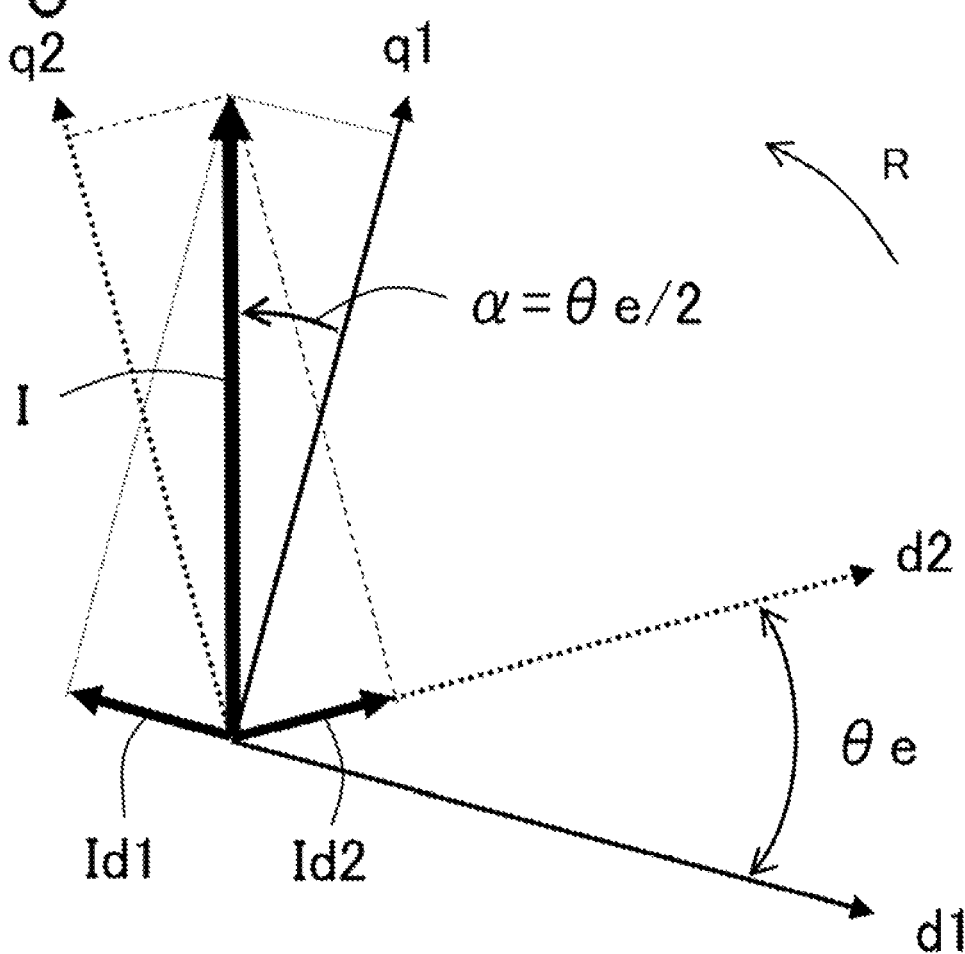
FIG. 8 is a figure explaining the increase in the positive direction of the d2-axis current according to Embodiment 1.

On the other hand, as the absolute value of the current vector increases, the phase advance α that the sixth-order torque ripple component becomes the smallest approaches the skew angle θe. This is caused by occurrence of the magnetic saturation explained in the following. As shown in FIG. 8 and the next equation, if α is set to θe/2, as the absolute value |I| of the current vector becomes large, a component of the d2-axis Id2 (referred to also as d2-axis current Id2) of current vector I increases in the positive direction, and a component of the d1-axis (referred to also as d1-axis current Id1) of current vector I increases in the negative direction.

$$Id2=|I|\times\cos(\pi/2-\theta e+\alpha)$$

$$Id1=-|I|\times\cos(\pi/2-\alpha) \quad (1)$$

Figure 9:
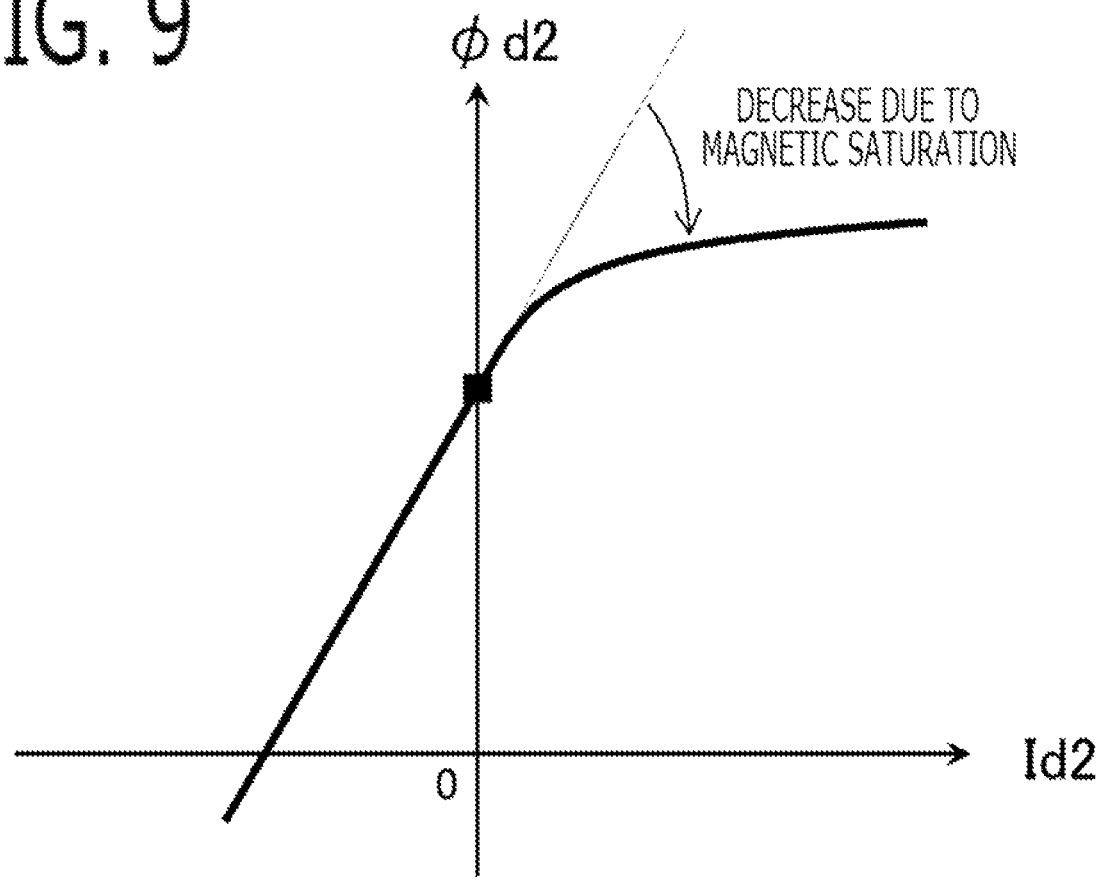
FIG. 9 is a figure explaining the magnetic saturation by the increase in the d2-axis current according to Embodiment 1.

FIG. 9 shows characteristics of an interlinkage flux φd2 of the d2-axis with respect to the d2-axis current Id2. The interlinkage flux φd2 of the d2-axis generated at the d2-axis current Id2=0 is the magnetic flux generated by the magnetic pole of the second skew step 112b. If the d2-axis current Id2 is decreased from 0, since it is a direction of weakening magnetic flux, the interlinkage flux φd2 of the d2-axis decreases in proportion to the d2-axis current Id2 with an inclination according to a prescribed d-axis inductance Ld.

On the other hand, if the d2-axis current Id2 is increased from 0, although the interlinkage flux φd2 of the d2-axis increases, the inclination decreases. This is because the magnetic saturation occurs in the teeth part of the stator which opposes to the magnetic pole of the second skew step 112b, and the d-axis inductance Ld decreases. If this magnetic saturation occurs, the sixth-order torque ripple component increases. Even if the absolute value |I| of the current vector increases, if the d2-axis current Id2 can be maintained around 0, occurrence of the magnetic saturation can be suppressed and occurrence of the sixth-order torque ripple component can be suppressed. In order to maintain the d2-axis current Id2 around 0, it is necessary to change the phase advance α from the skew angle θe/2 to the skew angle θe, as the absolute value |I| of the current vector increases.

Due to occurrence of this magnetic saturation, as the absolute value of the current vector increases, the phase advance α that the sixth-order torque ripple component becomes the smallest moves from the skew angle θe/2 to the skew angle θe. Accordingly, as the absolute value |I| of the current vector increases, the phase advance α of the magnetic pole position for control θc with respect to the magnetic pole position θ1 of the most delayed phase may be brought close to the skew angle θe corresponding to the magnetic pole position θ2 of the most advanced phase, from the skew angle θe/2 corresponding to the middle phase between the magnetic pole position θ1 of the most delayed phase and the magnetic pole position θ2 of the most advanced phase.

Since the characteristics of magnetic saturation is changed by the design of teeth and winding of the stator, in the case of the rotary electric machine that the magnetic saturation hardly occur by increase in the d-axis current, even if the phase advance α is not increased to the skew angle θe, the sixth-order torque ripple component can be minimized.

<Phase Change of Current Vector for Control According to Current>

Figure 10:
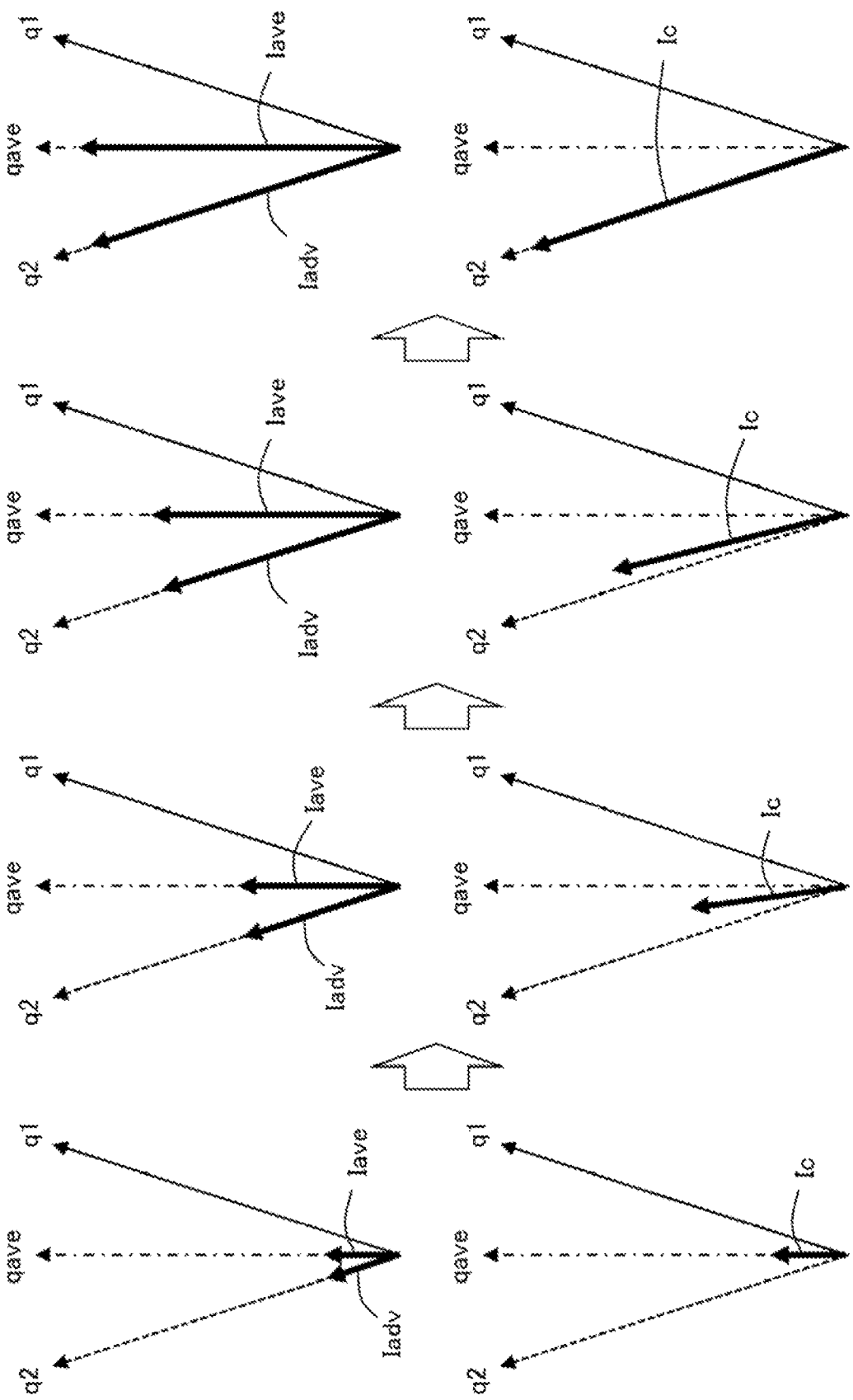
FIG. 10 is a figure explaining control of the current vector in the case of the Id=0 control according to Embodiment 1.

Then, when defining, as a current vector of most advanced phase Iadv, a current vector of the current command values calculated on the dq-axis rotating coordinate system of most advanced phase, and defining, as a current vector of middle phase Iave, a current vector of the current command values calculated on the dq-axis rotating coordinate system of middle phase, as shown in FIG. 10, the current control unit 33 brings a controlling current vector Ic close to the current vector of most advanced phase Iadv from the current vector of middle phase Iave, as the winding currents which flow into the three-phase windings increases.

Herein, the dq-axis rotating coordinate system of most advanced phase is a dq-axis rotating coordinate system which consists of the d2-axis defined in the magnetic pole position θ2 direction of the second skew step 112b whose phase is most advanced in the rotation direction R, and the q2-axis defined in the direction advanced to the d2-axis by 90 degrees in the electrical angle. The dq-axis rotating coordinate system of middle phase is a dq-axis rotating coordinate system which consists of a d-axis (hereinafter, referred to as dave-axis) defined in the direction of the middle phase between the magnetic pole position θ2 of the second skew step 112b whose phase is most advanced and the magnetic pole position θ1 of the first skew step 112a whose phase is most delayed in the rotation direction R, and a q-axis (hereinafter, referred to as qave-axis) defined in the direction advanced to the dave-axis by 90 degrees in the electrical angle.

According to this configuration, since the controlling current vector Ic is brought close to the current vector of most advanced phase Iadv from the current vector of middle phase Iave as the winding currents (absolute value of current vector) increase, when the winding currents are small, the torque ripple component generated by the magnetic pole of the most advanced phase and the torque ripple component generated by the magnetic pole of the most delayed phase are canceled with each other, and the sixth-order torque ripple component can be reduced. And, even when the winding currents increase, the d2-axis current Id2 of the most advanced phase can be suppressed from increasing until the magnetic saturation occurs, and the sixth-order torque ripple component can be reduced. Accordingly, the phase of the current vector with respect to the magnetic pole position which is shifted in the circumferential direction is changed appropriately according to increase and decrease in the winding currents, and the sixth-order torque ripple component can be reduced effectively.

As shown in FIG. 10, when defining, as the current vector of most advanced phase Iadv, a current vector of the current command values calculated by Id=0 control on the dq-axis rotating coordinate system of most advanced phase, and defining, as the current vector of middle phase Iave, a current vector of the current command values calculated by Id=0 control on the dq-axis rotating coordinate system of middle phase, the current control unit 33 brings the controlling current vector Ic close to the current vector of most advanced phase Iadv from the current vector of middle phase Iave, as the winding currents which flow into the three-phase windings increase.

According to this configuration, the current vector of most advanced phase Iadv becomes a current vector in the q2-axis direction of the dq-axis rotating coordinate system of most advanced phase, and the current vector of middle phase Iave becomes a current vector of the qave-axis direction of the dq-axis rotating coordinate system of middle phase. Then, as the winding currents increase, the controlling current vector can be brought close to the current vector in the q2-axis direction of the dq-axis rotating coordinate system of most advanced phase from the current vector of the qave-axis direction of the dq-axis rotating coordinate system of middle phase. The increase in the d2-axis current Id2 which expressed currents on the dq-axis rotating coordinate system of most advanced phase can be suppressed, and the increase in the sixth-order torque ripple component in the electrical angle can be suppressed.

<Change of Magnetic Pole Position for Control According to Current>

In the present embodiment, as the winding currents increase, the magnetic pole position setting unit 331 brings the magnetic pole position for control θc close to the magnetic pole position θ2 whose phase is most advanced in the rotation direction R, from the magnetic pole position θave of the middle phase between the magnetic pole position θ2 of the second skew step 112*b* whose phase is most advanced in the rotation direction R and the magnetic pole position θ1 of the first skew step 112*a* whose phase is most delayed. Then, the current command value calculation unit 332 calculates the current command values for control on the dq-axis rotating coordinate system for control which is set on the basis of the magnetic pole position for control θc. Then, the voltage command value calculation unit 333 calculates the voltage command values based on the detection values of currents and the current command values for control, on the dq-axis rotating coordinate system for control which is set on the basis of the magnetic pole position for control θc.

According to this configuration, as the winding currents increase, by bringing the magnetic pole position for control θc close to the magnetic pole position θ2 of the most advanced phase from the magnetic pole position of the middle phase, the current vector Ic of the current command values for control and the controlling current vector Ic can be brought close to the current vector of most advanced phase Iadv calculated on the dq-axis rotating coordinate system of most advanced phase, from the current vector of middle phase Iave calculated on the dq-axis rotating coordinate system of middle phase.

<Magnetic Pole Position Setting Unit 331>

As mentioned above, as the winding currents increase, the magnetic pole position setting unit 331 brings the magnetic pole position for control θc close to the magnetic pole position θ2 of the most advanced phase, from the magnetic pole position θave of the middle phase between the magnetic pole position θ2 of the most advanced phase and the magnetic pole position θ1 of the most delayed phase.

Figure 11:
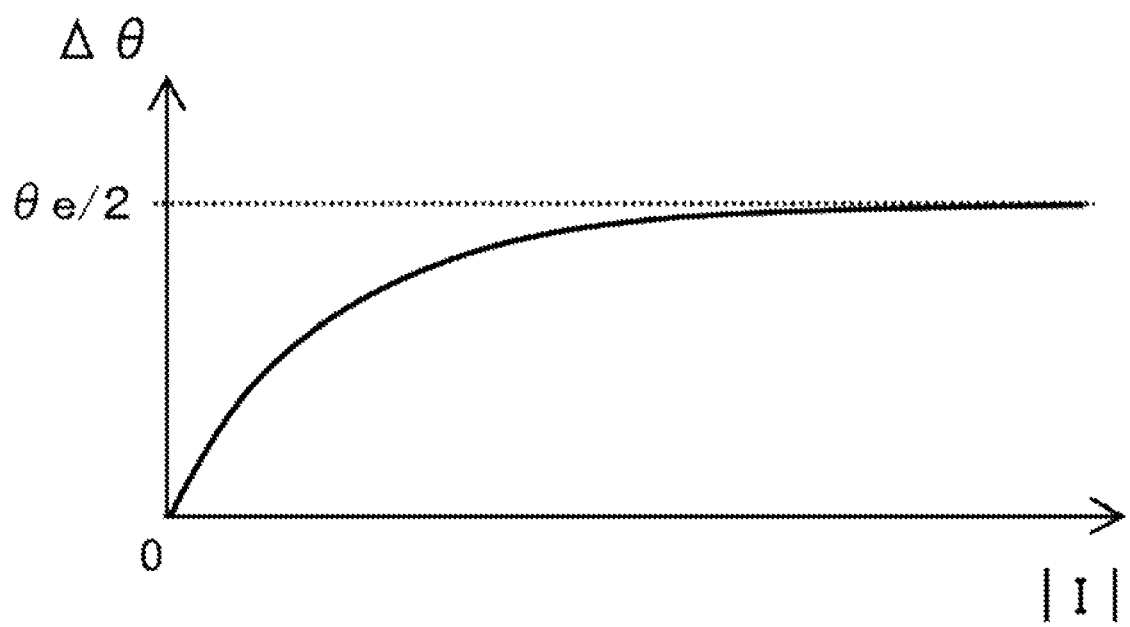
FIG. 11 is a figure explaining setting of the correction amount of magnetic pole position according to the current according to Embodiment 1.

For example, by referring to a correction amount setting data in which a relationship between the winding current |I| and a correction amount of magnetic pole position Δθ is preliminarily set as shown in FIG. 11, the magnetic pole position setting unit 331 calculates the correction amount of magnetic pole position Δθ corresponding to the present winding current |I|. Then, the magnetic pole position setting unit 331 sets a reference magnetic pole position θ0, based on the rotational angle θ detected by the rotation detection unit 31, as shown in the next equation. Then, the magnetic pole position setting unit 331 calculates the magnetic pole position for control θc by adding the correction amount Δθ to the reference magnetic pole position θ0. For example, if the magnetic pole position θave of the middle phase is set as the reference magnetic pole position θ0, the correction amount of magnetic pole position Δθ is set to approach the skew angle θe/2 from 0 as the winding current |I| increases.

$$\theta c = \theta 0 + \Delta\theta \quad (2)$$

$$\theta 0 = \theta ave$$

The magnetic pole position setting unit 331 calculates, as the winding current |I|, an absolute value of current vector, based on the current command value of d-axis Ido and the current command value of q-axis Iqo for control, as shown in the next equation. Since Ido is 0 by Id=0 control, the winding current |I| is proportional to the current command value of q-axis Iqo. Instead of the current command value of d-axis Ido and the current command value of q-axis Iqo for control, the current detection value of d-axis Idr and the current detection value of q-axis Iqr may be used.

$$|I| = \sqrt{(Ido^2 + Iqo^2)} = Iqo \quad (3)$$

<Current Command Value Calculation Unit 332>

The current command value calculation unit 332 calculates the current command values of d-axis and q-axis Ido, Iqo for control by Id=0 control, on the dq-axis rotating coordinate system for control. For example, as shown in the next equation, the current command value calculation unit 332 sets the current command value of d-axis Ido for control to 0, and sets the current command value of q-axis Iqo for control to a value obtained by multiplying a conversion coefficient Kt to the torque command value Tref. The torque command value Tref may be calculated in the controller 6, or may be transmitted from an external controller.

$$Ido = 0$$

$$Iqo = Kt \times Tref \quad (4)$$

<Voltage Command Value Calculation Unit 333>

The voltage command value calculation unit 333 calculates voltage command values based on the detection values of currents, the current command values for control, and the magnetic pole position for control θc. In the present embodiment, the voltage command value calculation unit 333 calculates the voltage command values based on the detection values of currents and the current command values for control, on the dq-axis rotating coordinate system for control which is set on the basis of the magnetic pole position for control θc. As shown in FIG. 1, the voltage command value calculation unit 333 is provided with a current coordinate conversion unit 3331, a dq-axis voltage command value calculation unit 3332, and a voltage coordinate conversion unit 3333.

The current coordinate conversion unit 3331 converts the current detection values Iur, Ivr, Iwr of the three-phase windings detected by the current detection unit 32 into the current detection value of d-axis Idr and the current detection value of q-axis Iqr on the dq-axis rotating coordinate system for the control which is set on the basis of the magnetic pole position for control θc. The d-axis is defined in the direction of the magnetic pole position for control θc, and the q-axis is defined in the direction advanced to the d-axis by 90 degrees in the electrical angle. Specifically, as shown in the next equation, the current coordinate conversion unit 3331 converts the current detection values of three-phase Iur, Ivr, Iwr into the current detection value of d-axis Idr and the current detection value of q-axis Iqr, by performing the three-phase/two-phase conversion and the rotating coordinate conversion based on the magnetic pole position for control θc.

$$\begin{bmatrix} Idr \\ Iqr \end{bmatrix} = \sqrt{\frac{2}{3}} \begin{bmatrix} \cos(\theta c) & \cos\left(\theta c - \frac{2}{3}\pi\right) & \cos\left(\theta c + \frac{2}{3}\pi\right) \\ -\sin(\theta c) & -\sin\left(\theta c - \frac{2}{3}\pi\right) & -\sin\left(\theta c + \frac{2}{3}\pi\right) \end{bmatrix} \begin{bmatrix} Iur \\ Ivr \\ Iwr \end{bmatrix} \quad (5)$$

The dq-axis voltage command value calculation unit 3332 performs a current feedback control that changes a voltage command value of d-axis Vdo and a voltage command value of q-axis Vqo by PI control and the like, so that the current detection value of d-axis Idr approaches the current command value of d-axis Ido for control, and the current detection value of q-axis Iqr approaches the current command value of q-axis Iqo for control. A feedforward control for non-interfering between the d-axis current and the q-axis current and the like may be performed.

The voltage coordinate conversion unit 3333 converts the voltage command values of dq-axis Vdo, Vqo on the dq-axis rotating coordinate system for control into the voltage command values of three-phase Vuo, Vvo, Vwo, by performing the fixed coordinate conversion and the two-phase/three-phase conversion based on the magnetic pole position for control θc. Various kinds of modulation, such as the third order harmonic wave injection modulation, may be added to the voltage command values of three-phase.

$$\begin{bmatrix} Vuo \\ Vvo \\ Vwo \end{bmatrix} = \sqrt{\frac{2}{3}} \begin{bmatrix} \cos(\theta c) & -\sin(\theta c) \\ \cos\left(\theta c - \frac{2}{3}\pi\right) & -\sin\left(\theta c - \frac{2}{3}\pi\right) \\ \cos\left(\theta c + \frac{2}{3}\pi\right) & -\sin\left(\theta c + \frac{2}{3}\pi\right) \end{bmatrix} \begin{bmatrix} Vdo \\ Vqo \end{bmatrix} \quad (6)$$

<Switching Control Unit 34>

The switching control unit 34 controls on/off the plurality of switching devices based on the voltage command values. In the present embodiment, the switching control unit 34 controls on/off switching devices by comparing each of the voltage command values of three-phase Vuo, Vvo, Vwo and a carrier wave CA which vibrates at the carrier period Tc. The carrier wave CA is a triangular wave which vibrates centering on 0 at a carrier period Tc with an amplitude of half value Vdc/2 of the power source voltage. The power source voltage Vdc may be detected by a voltage sensor.

Figure 12:
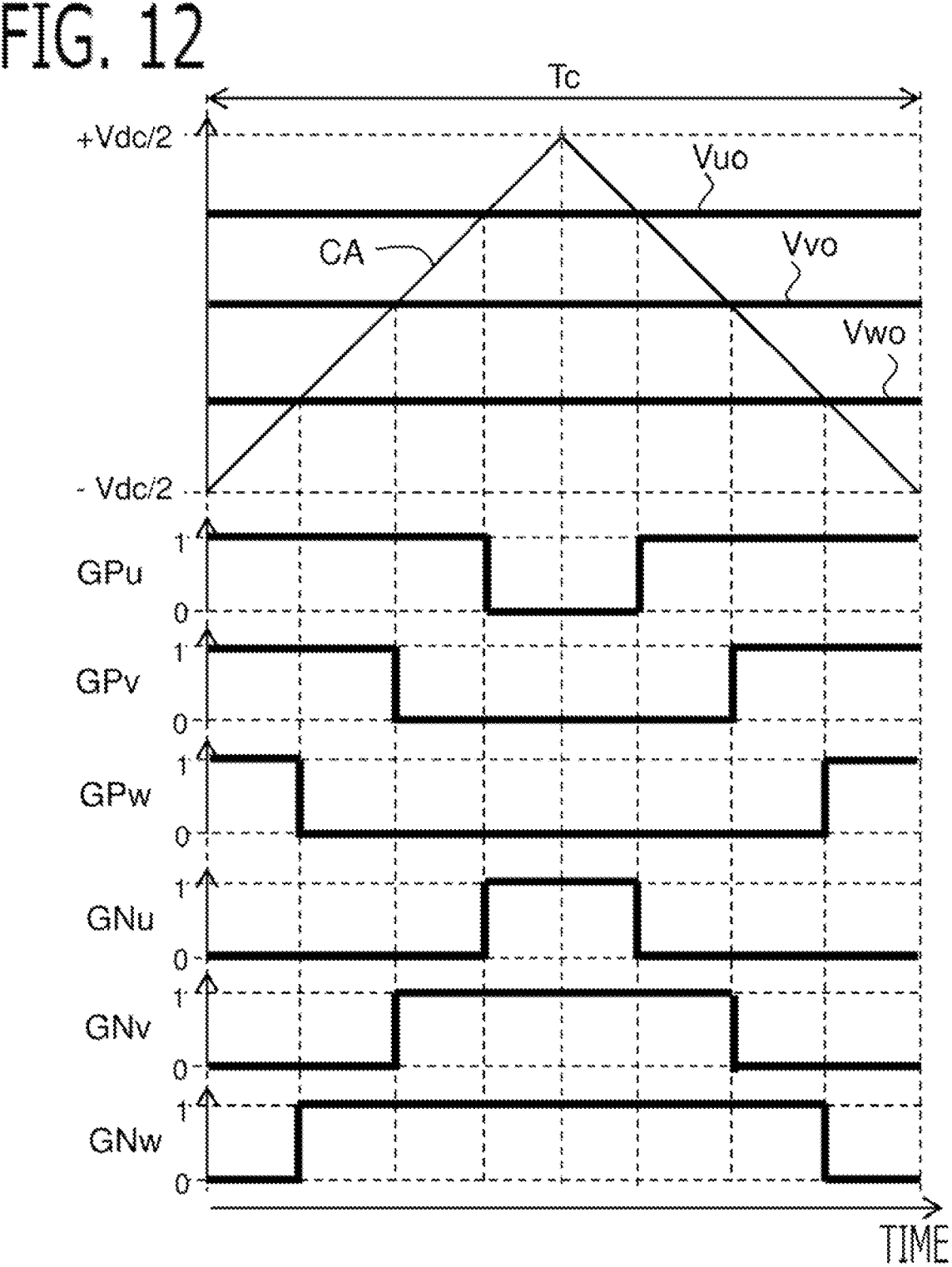
FIG. 12 is a time chart for explaining the switching control according to Embodiment 1.

As shown in FIG. 12, about each phase, the switching control unit 34 turns on the switching signal GP of the positive electrode side switching device (in this example, 1) and turns on the positive electrode side switching device when carrier wave CA is less than the voltage command value, and turns off the switching signal GP of the positive electrode side switching device (in this example, 0) and turns off the positive electrode side switching device when the carrier wave CA exceeds the voltage command value. On the other hand, about each phase, the switching control unit 34 turns off the switching signal GN of the negative electrode side switching device (in this example, 0) and turns off the negative electrode side switching device when the carrier wave CA is less than the voltage command value, and turns on the switching signal GN of the negative electrode side switching device (in this example, 1) and turns on the negative electrode side switching device when the carrier wave CA exceeds the voltage command value. About each phase, between the on period of the positive electrode side switching device and the on period of the negative electrode side switching device, a short circuit prevention period (dead time) which turns off both of the positive electrode side and the negative electrode side switching device may be provided.

2. Embodiment 2

The rotary electric machine apparatus according to Embodiment 2 will be explained. The explanation for constituent parts the same as those in Embodiment 1 will be omitted. The basic configuration of the rotary electric machine 1, the inverter 4, and the controller 6 according to the present embodiment is the same as that of Embodiment 1. Embodiment 2 is different from Embodiment 1 in processing of the controller 6.

Even in the present embodiment, in order to minimize the increase in the sixth-order torque ripple component due to the magnetic saturation, as shown in FIG. 10, as the winding currents which flow into the three-phase windings increase, the current control unit 33 brings the current vector Ic of the current command values for control close to the current vector of most advanced phase Iadv from the current vector of middle phase Iave.

However, in the present embodiment, a realization method is different from Embodiment 1. That is to say, the magnetic pole position setting unit 331 detects, as the magnetic pole position for control θc, the magnetic pole position θave of the middle phase between the magnetic pole position θ2 of the second skew step 112b whose phase is most advanced and the magnetic pole position θ1 of the first skew step 112a whose phase is most delayed in the rotation direction R. The current command value calculation unit 332 calculates the current command values on the dq-axis rotating coordinate system of middle phase which is set on the basis of the magnetic pole position θave of the middle phase; and calculates the current command values for control by decreasing the d-axis component of the current command values by the d-axis current decrease amount ΔId. As the winding currents increase, the current command value calculation unit 332 increases the d-axis current decrease amount ΔId so that the current vector Ic of the current command values for control approaches the current vector of most advanced phase Iadv from the current vector of middle phase Iave. Then, the voltage command value calculation unit 333 calculates the voltage command values based on the detection values of currents and the current command values for control, on the dq-axis rotating coordinate system of middle phase which is set on the basis of the magnetic pole position θave of the middle phase.

According to this configuration, by decreasing the d-axis component of the current command values calculated on the dq-axis rotating coordinate system of middle phase as the winding currents increase, the current vector Ic of the current command values for control can be brought close to the current vector of most advanced phase Iadv from the current vector of middle phase Iave. The increase in the d2-axis current Id2 which expressed currents on the dq-axis rotating coordinate system of most advanced phase can be suppressed, and the increase in the sixth-order torque ripple component in the electrical angle can be suppressed.

The current command value calculation unit 332 calculates the current command values of d-axis and q-axis Idave, Iqave of the middle phase by Id=0 control, on the dq-axis rotating coordinate system of middle phase. For example, as shown in the next equation, the current command value calculation unit 332 sets the current command value of d-axis Idave of the middle phase to 0, and sets the current command value of q-axis Iqave of the middle phase to a value obtained by multiplying the conversion coefficient Kt to the torque command value Tref.

$$Idave=0$$

$$Iqave=Kt \times Tref \tag{7}$$

Figure 13:
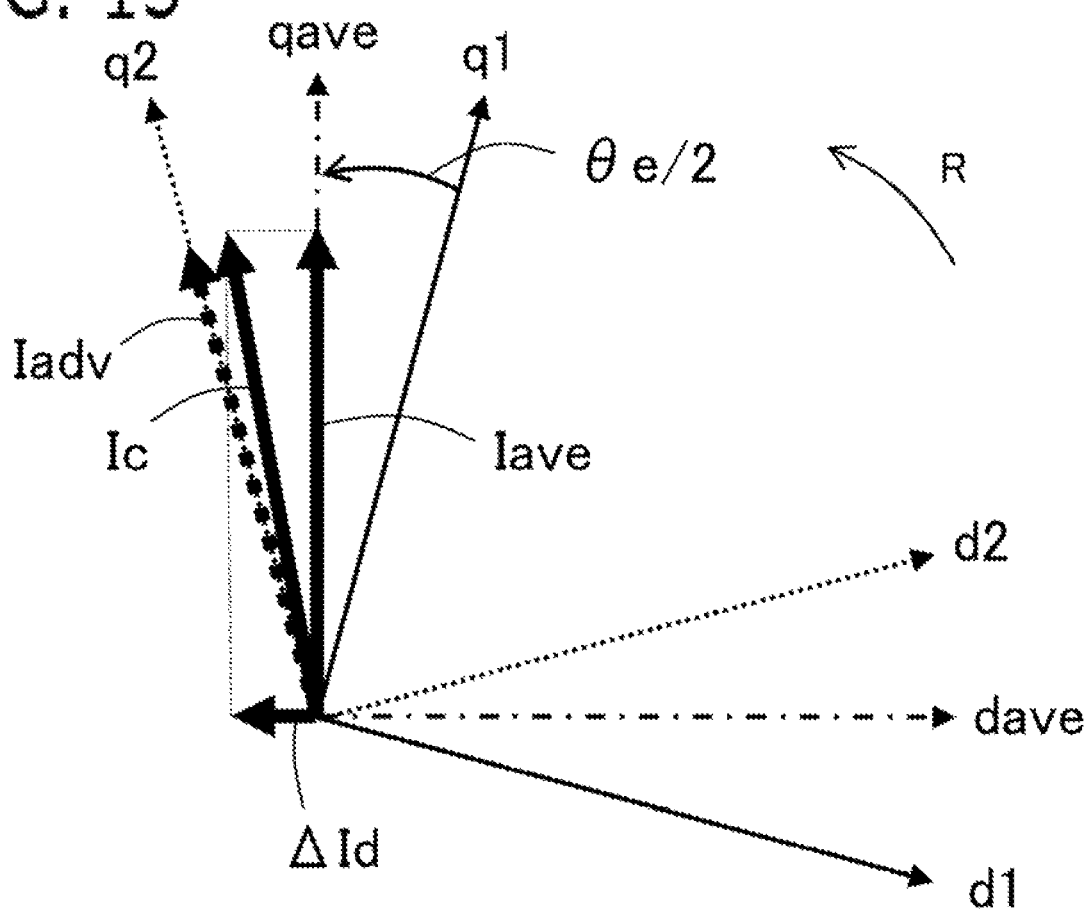
FIG. 13 is a figure explaining control of the current vector according to Embodiment 2.

Then, as shown in FIG. 13 and the next equation, the current command value calculation unit 332 calculates the current command value of d-axis Ido for control by decreasing the current command value of d-axis Idave of the middle phase by the d-axis current decrease amount ΔId. The current command value calculation unit 332 sets the current command value of q-axis Iqave of the middle phase as the current command value of q-axis Iqo for control as it is.

$$Ido=Idave-\Delta Id$$

$$Iqo=Iqave \tag{8}$$

Figure 14:
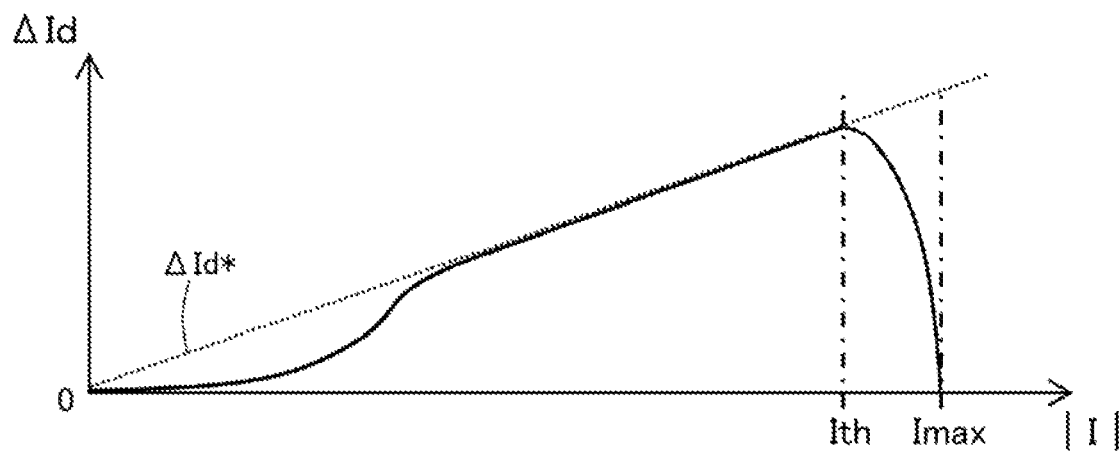
FIG. 14 is a figure explaining setting of the d-axis current decrease amount according to the current according to Embodiment 2.

By referring to a decrease amount setting data in which a relationship between the winding current |I| and the d-axis current decrease amount ΔId is preliminarily set, the current command value calculation unit 332 calculates the d-axis current decrease amount ΔId corresponding to the present winding current |I|. As shown in FIG. 14, in the decrease amount setting data, the d-axis current decrease amount ΔId is increased so that the current vector Ic of the current command values for control approaches the current vector of most advanced phase Iadv from the current vector of middle phase Iave the as winding current |I| increases. The d-axis current decrease amount ΔId* that the current vector Ic of the current command values for control coincides with the current vector of most advanced phase Iadv becomes like the next equation; and the d-axis current decrease amount ΔId is brought close to ΔId* from 0 as the winding current |I| increases.

$$\Delta Id^*=\tan(\theta e/2) \times Iqave \tag{9}$$

As shown in the example of FIG. 13, the current vector Iave of the current command values of the middle phase calculated by Id=0 control on the dq-axis rotating coordinate system of middle phase coincides with the qave-axis which is the q-axis of the dq-axis rotating coordinate system of middle phase. By decreasing the d-axis component of the current command values of the middle phase by the d-axis current decrease amount Δ Id, the current vector Ic of the current command values for control can be brought close to the current vector of most advanced phase Iadv which coincides with the q2-axis.

The current command value calculation unit 332 calculates, as the winding current |I|, an absolute value of current vector based on the current command value of d-axis Idave and the current command value of q-axis Iqave of the middle phase, as shown in the next equation. Since Idave is 0 by Id=0 control, the winding current |I| is proportional to the current command value of q-axis Iqave. Instead of the current command value of d-axis Idave and the current command value of q-axis Iqave of the middle phase, the current detection value of d-axis Idr and the current detection value of q-axis Iqr may be used.

$$|I|=\sqrt{(Idave^2+Iqave^2)} \tag{10}$$

<Decrease of d-Axis Component by Upper Limit Current Value>

Figure 15:
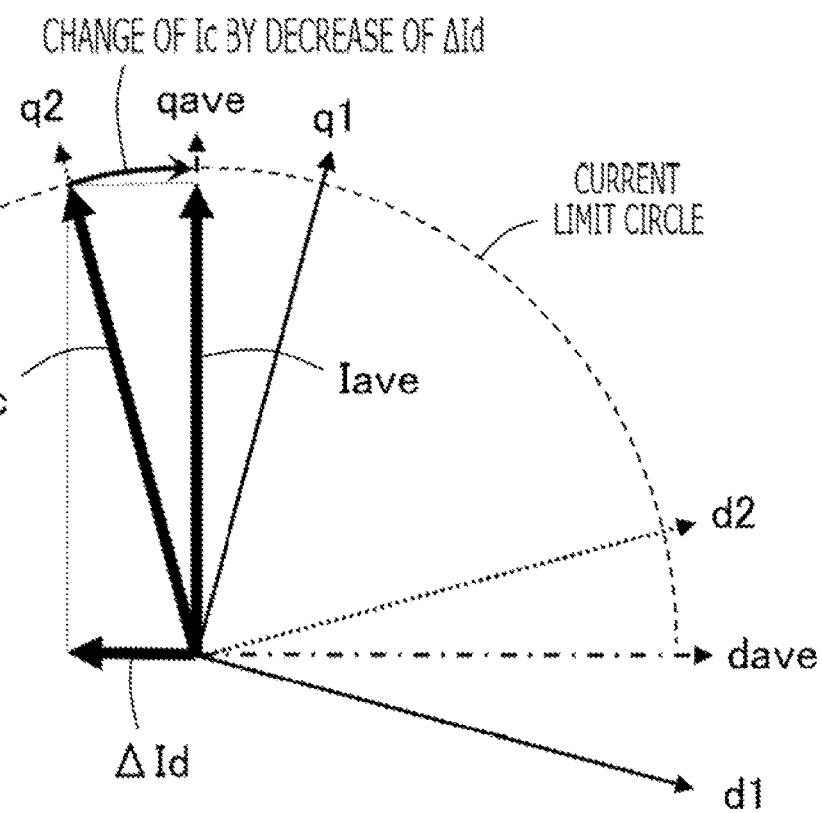
FIG. 15 is a figure explaining control of the current vector around the upper limit current value according to Embodiment 2.

Since the torque of the rotary electric machine becomes an average of a torque by the magnetic pole of the most advanced phase, and a torque by the magnetic pole of the most delayed phase, it changes in proportion to the q-axis current of the middle phase. That is to say, the torque of the rotary electric machine becomes large, as the q-axis current of the middle phase becomes large. As a current limit circle is shown in FIG. 15, the current which can be supplied to the windings has an upper limit. As described above, by decreasing the d-axis component of the current command values of the middle phase by the d-axis current decrease amount ΔId, the absolute value of the current vector increases. On the other hand, if the absolute value of the current vector reaches the upper limit current value, it becomes impossible to increase the q-axis current of the middle phase, and torque cannot be increased by a portion of the d-axis current decrease amount ΔId. As the required performance of the rotary electric machine, the increase in the maximum torque may be more important than reduction of the sixth-order torque ripple component.

Then, when the winding current |I| exceeds a threshold value Ith which is set to a value smaller than the upper limit current value Imax, the current command value calculation unit 332 brings the current vector Ic of the current command values for control close to the current vector of middle phase Iave from the current vector of most advanced phase Iadv, as the winding current |I| approaches the upper limit current value Imax. In the present embodiment, as shown in FIG. 14, when the winding current |I| (in this example, the current command value of q-axis Iqave of the middle phase) exceeds the threshold value Ith, the current command value calculation unit 332 decreases the d-axis current decrease amount ΔId to 0, as the winding current |I| approaches the upper limit current value Imax.

According to this configuration, when the winding current |I| approaches the upper limit current value Imax, the current vector Ic of the current command values for control can be brought close to the current vector of middle phase Iave from the current vector of most advanced phase Iadv, and the maximum torque can be increased while sacrificing the reduction of the sixth-order torque ripple component.

In the rotary electric machine in which the reduction of the sixth-order torque ripple component is required more than the increase in the maximum torque, this processing may not be performed.

3. Embodiment 3

The rotary electric machine apparatus according to Embodiment 3 will be explained. The explanation for constituent parts the same as those in each of Embodiments 1 or 2 will be omitted. The basic configuration of the rotary electric machine 1, the inverter 4, and the controller 6 according to the present embodiment is the same as that of Embodiment 1 or 2. The rotary electric machine 1 is rotatable to one side and the other side, and accordingly, processing of the controller 6 is different from Embodiment 1 or 2.

In Embodiments 1 and 2, the rotary electric machine 1 rotates only to one side. However, depending on application, the rotary electric machine may be rotatable to one side and the other side. Then, the current control unit 33 sets the magnetic pole position whose phase is most advanced and the magnetic pole position whose phase is most delayed in the rotation direction, according to the rotation direction of one side or the other side. The same rotation direction as the rotation direction R of Embodiment 1 is set to a rotation direction R1 of one side, and a rotation direction opposite to the rotation direction R of Embodiment 1 is sets to a rotation direction R2 of the other side.

Figure 16:
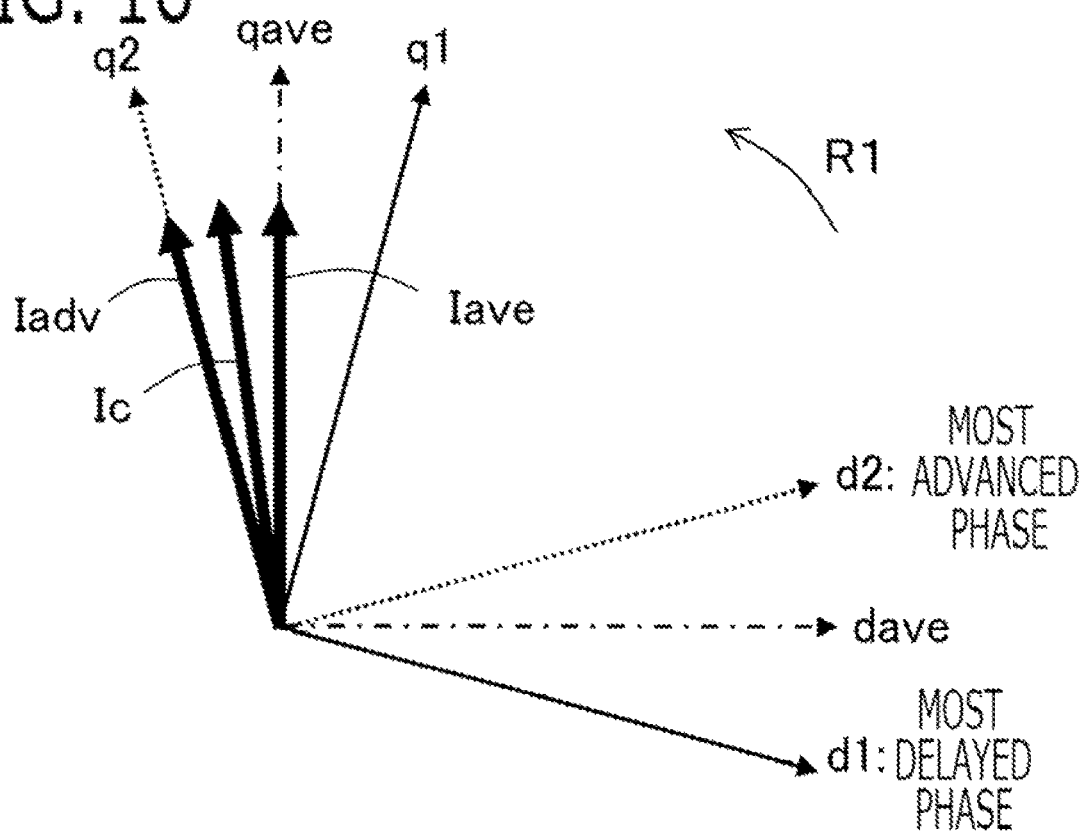
FIG. 16 is a figure explaining the coordinate system in the case of the rotation direction of one side according to Embodiment 3.

As shown in FIG. 16, if the rotation direction is the rotation direction R1 of one side similarly to Embodiment 1, the dq-axis rotating coordinate system of most advanced phase is a dq-axis rotating coordinate system which consists of the d2-axis defined in the direction of the magnetic pole position θ2 of the second skew step 112b whose phase is most advanced in the rotation direction R1 of one side, and the q2-axis defined in the direction advanced to the d2-axis by 90 degrees in the electrical angle in the rotation direction R1 of one side. The dq-axis rotating coordinate system of middle phase is a dq-axis rotating coordinate system which consists of the dave-axis defined in the direction of the middle phase between the magnetic pole position θ2 of the second skew step 112b whose phase is most advanced and the magnetic pole position θ1 of the first skew step 112a whose phase is most delayed in the rotation direction R1 of one side, and the qave-axis defined in the direction advanced to the dave-axis by 90 degrees in the electrical angle in the rotation direction R1 of one side.

Figure 17:
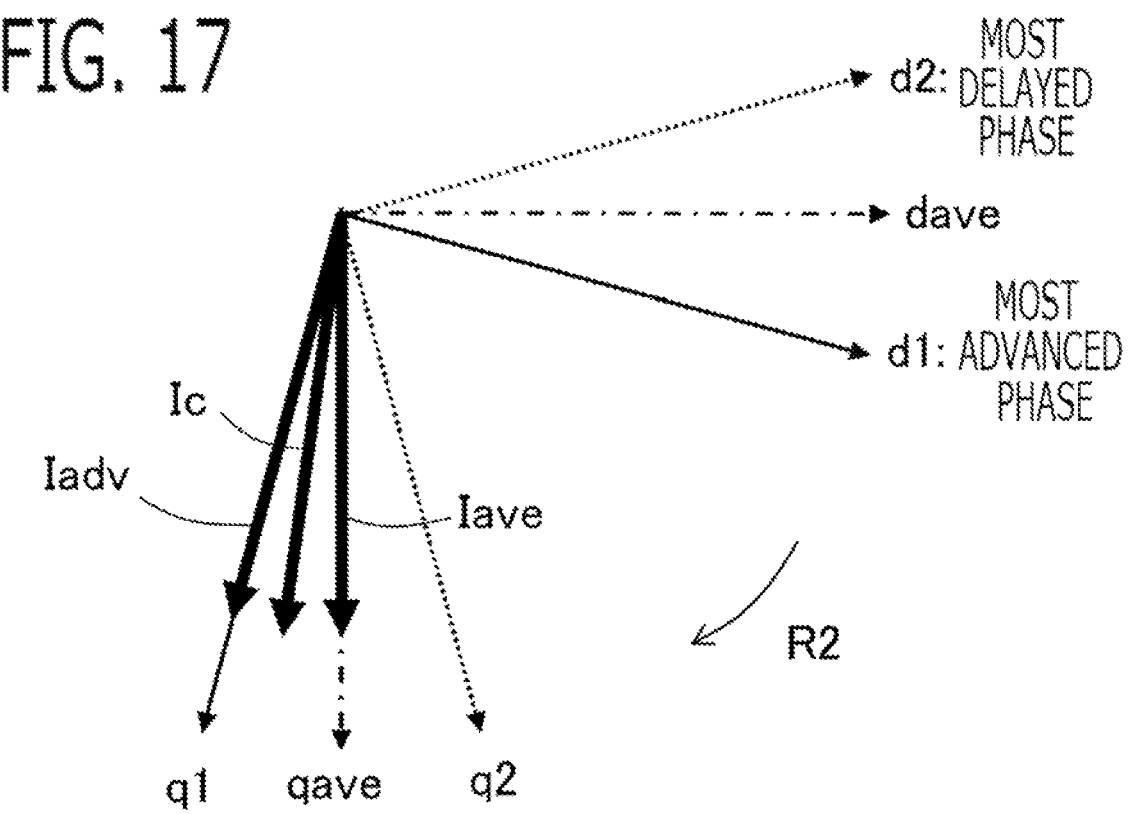
FIG. 17 is a figure explaining the coordinate system in the case of the rotation direction of the other side according to Embodiment 3.

As shown in FIG. 17, opposite to Embodiment 1, if the rotation direction is the rotation direction R2 of the other side, the dq-axis rotating coordinate system of most advanced phase is a dq-axis rotating coordinate system which consists of the d1-axis defined in the direction of the magnetic pole position θ1 of the first skew step 112a whose phase is most advanced in the rotation direction R2 of the other side, and the q1-axis defined in the direction advanced to the d1-axis by 90 degrees in the electrical angle in the rotation direction R2 of the other side. The dq-axis rotating coordinate system of middle phase is a dq-axis rotating coordinate system which consists of the dave-axis defined in the direction of the middle phase between the magnetic pole position θ1 of the first skew step 112a whose phase is most advanced and the magnetic pole position θ2 of the second skew step 112b whose phase is most delayed in the rotation direction R2 of the other side, and the qave-axis defined in the direction advanced to the dave-axis by 90 degrees in the electrical angle in the rotation direction R2 of the other side.

Then, using the dq-axis rotating coordinate system which is set according to the rotation direction described above, similarly to Embodiment 1 or 2, when defining, as a current vector of most advanced phase Iadv, a current vector of the current command values calculated on the dq-axis rotating coordinate system of most advanced phase, and defining, as a current vector of middle phase Iave, a current vector of the current command values calculated on the dq-axis rotating coordinate system of middle phase, the current control unit 33 brings the controlling current vector close to the current vector of most advanced phase Iadv from the current vector of middle phase Iave, as the winding currents which flow into the three-phase windings increase.

<If Method Similar to Embodiment 1 is Used>

The case where a method similar to Embodiment 1 is used is explained. When the rotation direction is the rotation direction R1 of one side, similarly to Embodiment 1, as the winding currents increase, the magnetic pole position setting unit 331 brings the magnetic pole position for control θc close to the magnetic pole position θ2 of the second skew step 112b whose phase is most advanced in the rotation direction R1 of one side from the magnetic pole position θave of the middle phase. The current command value calculation unit 332 calculates the current command values for control on the dq-axis rotating coordinate system for control which is set on the basis of the magnetic pole position for control θc. Then, the voltage command value calculation unit 333 calculates the voltage command values based on the detection values of currents and the current command values for control, on the dq-axis rotating coordinate system for control which is set on the basis of the magnetic pole position for control θc. The dq-axis rotating coordinate system for the control in this case consists of the dc-axis defined in the direction of the magnetic pole position for control θc, and the qc-axis defined in the direction advanced to the dc-axis by 90 degrees in the electrical angle in the rotation direction R1 of one side.

When the rotation direction is the rotation direction R2 of the other side, as the winding currents increase, the magnetic pole position setting unit 331 brings the magnetic pole position for control θc close to the magnetic pole position θ1 of the first skew step 112a whose phase is most advanced in the rotation direction R2 of the other side from the magnetic pole position θave of the middle phase. The current command value calculation unit 332 calculates the current command values for control on the dq-axis rotating coordinate system for control which is set on the basis of the magnetic pole position for control θc. Also in this case, similarly to the case of the rotation direction R1 of one side, the current command value of q-axis Iqo becomes a positive value. Then, the voltage command value calculation unit 333 calculates the voltage command values based on the detection values of currents and the current command values for control, on the dq-axis rotating coordinate system for control which is set on the basis of the magnetic pole position for control θc. The dq-axis rotating coordinate system for the control in this case consists of the dc-axis defined in the direction of the magnetic pole position for control θc, and the qc-axis defined in the direction advanced to the dc-axis by 90 degrees in the electrical angle in the rotation direction R2 of the other side.

<If Method Similar to Embodiment 2 is Used>

Next, the case where a method similar to Embodiment 2 is used is explained. When the rotation direction is the rotation direction R1 of one side, similarly to Embodiment 1, the magnetic pole position setting unit 331 detects the magnetic pole position θave of the middle phase as the magnetic pole position for control θc. The current command value calculation unit 332 calculates the current command values on the dq-axis rotating coordinate system of middle phase which is set on the basis of the magnetic pole position θave of the middle phase; and calculates the current command values for control by decreasing the d-axis component of the current command values by the d-axis current decrease amount ΔId. As the winding currents increase, the current command value calculation unit 332 increases the d-axis current decrease amount ΔId so that the current vector Ic of the current command values for control approaches the current vector of most advanced phase Iadv from the current vector of middle phase Iave. Then, the voltage command value calculation unit 333 calculates the voltage command values based on the detection values of currents and the current command values for control, on the dq-axis rotating coordinate system of middle phase which is set on the basis of the magnetic pole position θave of the middle phase. The dq-axis rotating coordinate system of middle phase in this case consists of the dave-axis defined in the direction of the magnetic pole position θave of the middle phase, and the qave-axis defined in the direction advanced to the dave-axis by 90 degrees in the electrical angle in the rotation direction R1 of one side.

When the rotation direction is the rotation direction R2 of the other side, the magnetic pole position setting unit 331 detects the magnetic pole position θave of the middle phase as the magnetic pole position for control θc. The current command value calculation unit 332 calculates the current command values on the dq-axis rotating coordinate system of middle phase which is set on the basis of the magnetic pole position θave of the middle phase; and calculates the current command values for control by decreasing the d-axis component of the current command values by the d-axis current decrease amount ΔId. As the winding currents increase, the current command value calculation unit 332 increases the d-axis current decrease amount ΔId so that the current vector Ic of the current command values for control approaches the current vector of most advanced phase Iadv from the current vector of middle phase Iave. Also in this case, similarly to the case of the rotation direction R1 of one side, the current command value of q-axis Iqo becomes a positive value, and the current command value of d-axis Ido becomes a negative value. Then, the voltage command value calculation unit 333 calculates the voltage command values based on the detection values of currents and the current command values for control, on the dq-axis rotating coordinate system of middle phase which is set on the basis of the magnetic pole position θave of the middle phase. The dq-axis rotating coordinate system of middle phase in this case consists of the dave-axis defined in the direction of the magnetic pole position θave of the middle phase, and the qave-axis defined in the direction advanced to the dave-axis by 90 degrees in the electrical angle in the rotation direction R2 of the other side.

<Other Example of Rotation Direction of the Other Side>

Figure 18:
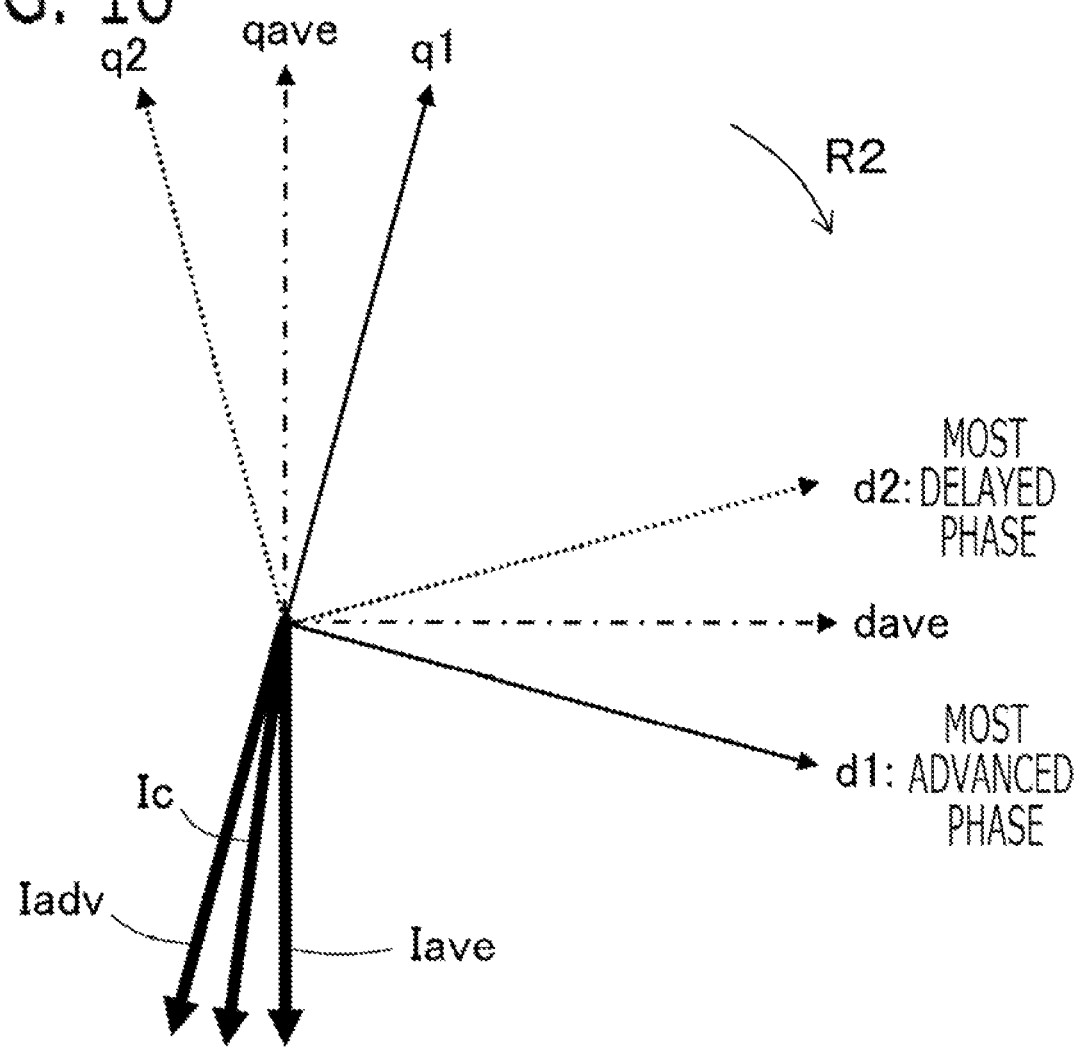
FIG. 18 is a figure explaining the coordinate system of another example in the case of the rotation direction of the other side according to Embodiment 3.

Alternatively, as shown in FIG. 18, when the rotation direction is the rotation direction R2 of the other side, the dq-axis rotating coordinate system of most advanced phase may be set to a dq-axis rotating coordinate system which consists of the d1-axis defined in the direction of the magnetic pole position θ1 of the first skew step 112*a* whose phase is most advanced in the rotation direction R2 of the other side, and the q1-axis defined in the direction advanced to the d1-axis by 90 degrees in the electrical angle in the rotation direction R1 of one side. The dq-axis rotating coordinate system of middle phase may be set to a dq-axis rotating coordinate system which consists of the dave-axis defined in the direction of the middle phase between the magnetic pole position θ1 of the first skew step 112*a* whose phase is most advanced and the magnetic pole position θ2 of the second skew step 112*b* whose phase is most delayed in the rotation direction R2 of the other side, and the qave-axis defined in the direction advanced to the dave-axis by 90 degrees in the electrical angle in the rotation direction R1 of one side. In this case, the current command value of q-axis Iqo becomes a negative value that the positive or negative sign is reversed. Also in this case, it becomes equivalent to an above-mentioned configuration substantially.

<Electric Power Steering Apparatus>

Figure 19:
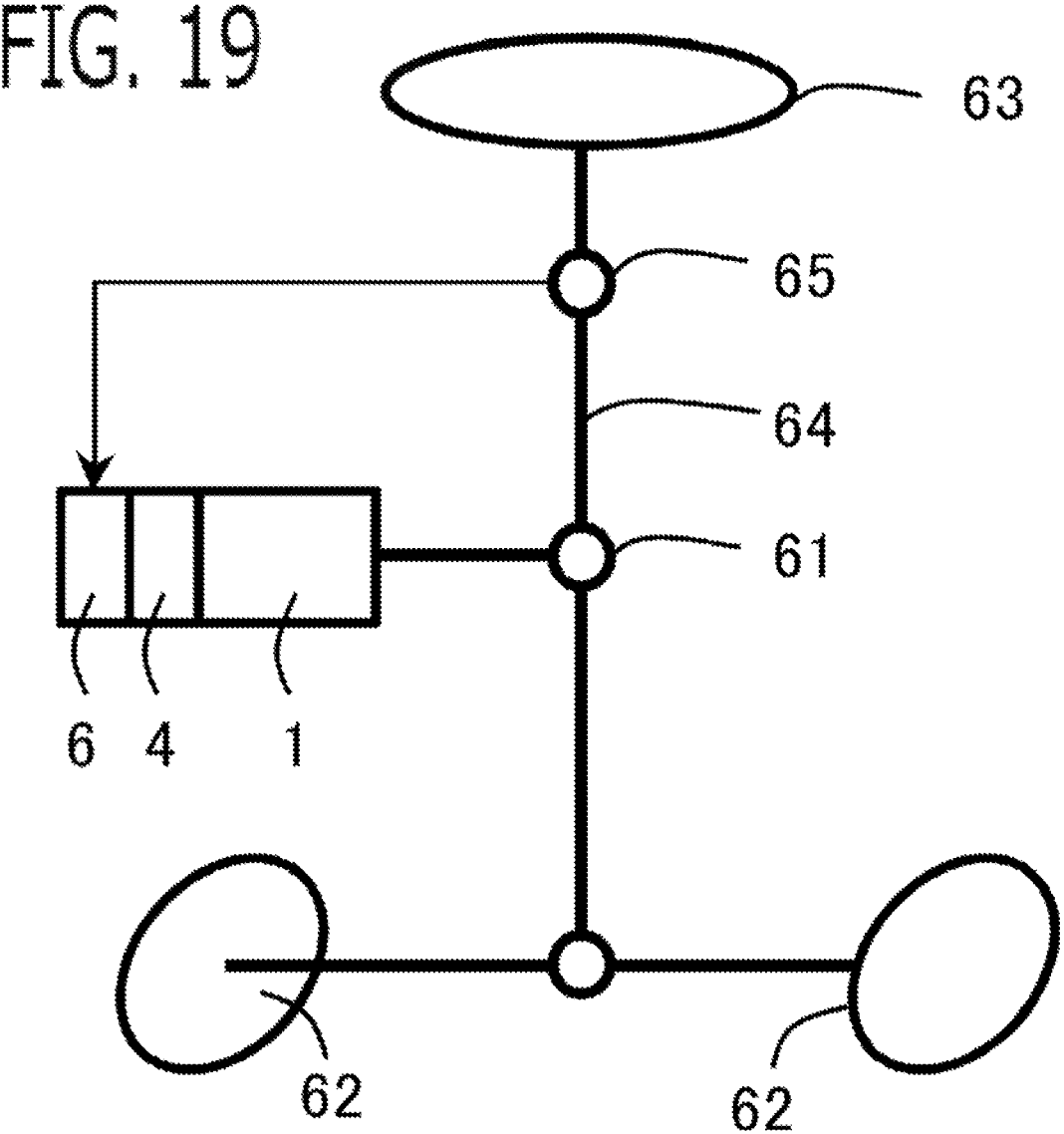
FIG. 19 is a figure explaining the electric power steering apparatus according to Embodiment 3.

This kind rotary electric machine is used for a driving force source of an electric power steering apparatus as shown in FIG. 19, for example. The electric power steering device is provided with a handle 63 that a driver rotates right and left, a shaft 64 that is connected with the handle 63 and transmits a steering wheel torque by the handle 63 to a steering mechanism of wheels 62, a torque sensor 65 that is mounted on the shaft 64 and detects the steering wheel torque by the handle 63, and a driving force transmission mechanisms 61, such as a worm gear mechanism, which transmits a driving force of the rotary electric machine 1 to the shaft 64. The controller 6 makes the rotary electric machine 1 output a torque according to a steering torque of the handle 63 detected by the torque sensor 65. Accordingly, the torque command value Tref is set according to the steering torque detected by the torque sensor 65.

When the driver rotates the handle 63 to right side, the rotary electric machine 1 rotates in the rotation direction R1 of one side, for example, and the controller 6 makes the rotary electric machine 1 output a torque of the rotation direction R1 of one side according to the steering torque. When the driver rotates the handle 63 to left side, the rotary electric machine 1 rotates in the rotation direction R2 of the other side, for example, and the controller 6 makes the rotary electric machine 1 output a torque of the rotation direction R2 of the other side according to the steering torque.

4. Embodiment 4

The rotary electric machine apparatus according to Embodiment 4 will be explained. The explanation for constituent parts the same as those in each of Embodiments 1 or 2 will be omitted. The basic configuration of the rotary electric machine 1, the inverter 4, and the controller 6 according to the present embodiment is the same as that of Embodiment 1 or 2. The permanent magnet is embedded inside the rotor, and the calculation method of the current command values is different from Embodiment 1 or 2.

Figure 20:
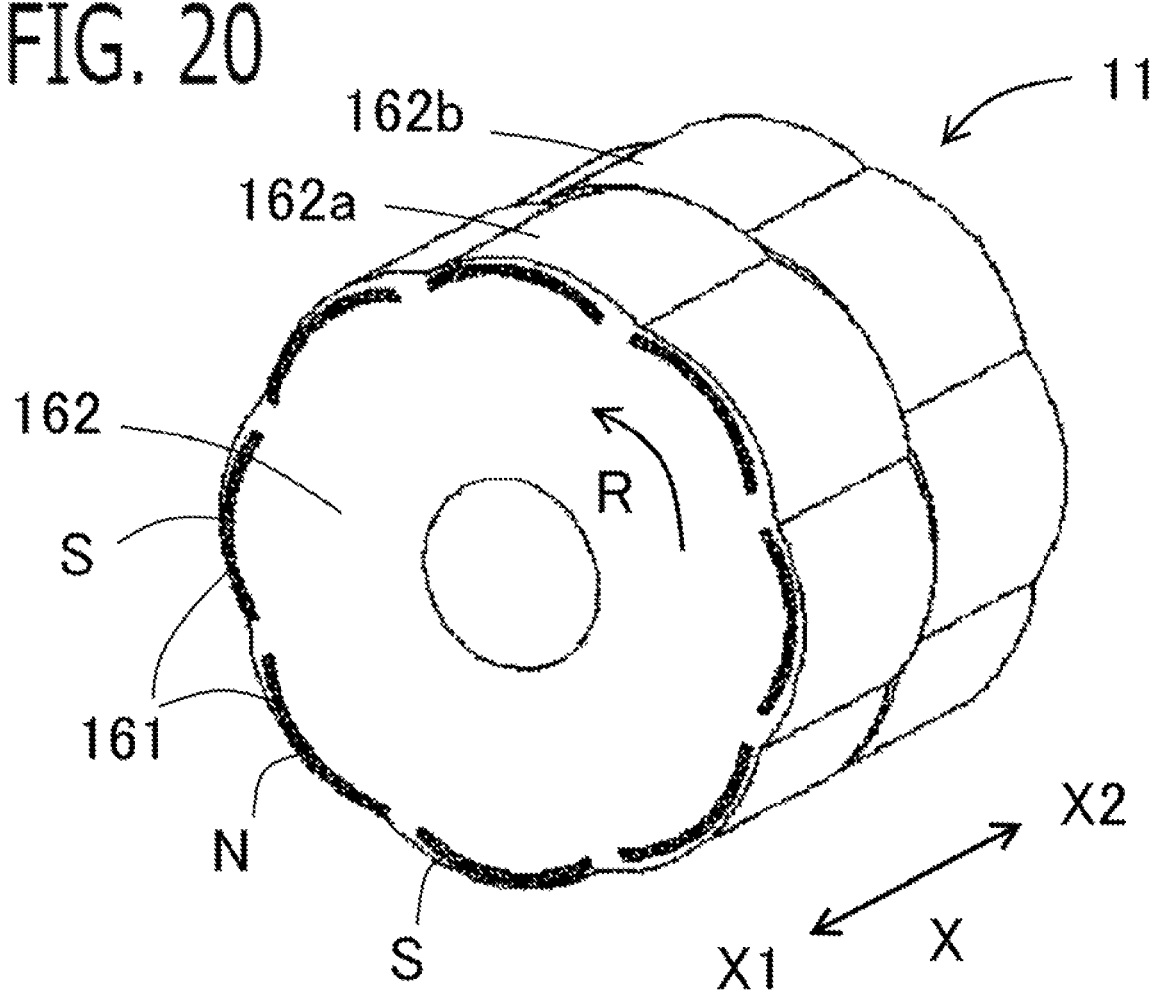
FIG. 20 is a perspective view of the rotor according to Embodiment 4.

In the present embodiment, as shown in FIG. 20, the permanent magnets 161 are embedded inside the rotor 11, and it is an embedded magnet type synchronous motor. The rotor 11 is provided with a rotor core 162 and the permanent magnets 161 are embedded inside the rotor core 162.

Similarly to Embodiment 1, the permanent magnets 161 have the skew structure in which the magnetic pole positions are shifted in the circumferential direction in two steps in the axial direction X. A first skew step 162*a* is provided in the axial direction one side X1 of the rotor 11, and a second skew step 162*b* is provided in the axial direction the other side X2. In peripheral part of each of the first and the second skew steps 162*a*, 162*b*, eight magnetic poles 161 (four N poles and four S poles) are disposed at equal intervals in the circumferential direction. The N pole and the S pole are disposed alternately in the circumferential direction.

The magnetic poles 161 (for example, N poles) of the second skew step 162*b* and the magnetic poles 161 (for example, N poles) of the first skew step 162*a* are shifted in the circumferential direction with each other. In this example, the magnetic poles 161 of the second skew step 162*b* are shifted by 30 degrees in the rotation direction R in the electrical angle with respect to the magnetic poles 161 of the first skew step 162*a*, and the skew angle θe is 30 degrees in the electrical angle. The magnetic pole position θ2 of the second skew step 162b is advanced to the magnetic pole position θ1 of the first skew step 162a by the skew angle θe (in this example, 30 degrees) in the rotation direction R in the electrical angle.

Therefore, similarly to Embodiment 1, the dq-axis rotating coordinate system of most advanced phase, which is set on the basis of the magnetic pole position θ2 of the second skew step 162b whose phase is most advanced in the rotation direction R, consists of the d2-axis defined in the magnetic pole position θ2 direction of the second skew step 162b, and the q2-axis defined in the direction advanced to the d2-axis by 90 degrees in the electrical angle.

The dq-axis rotating coordinate system of most delayed phase, which is set on the basis of the magnetic pole position θ1 of the first skew step 162a whose phase is most delayed in the rotation direction R, consists of the d1-axis defined in the magnetic pole position θ1 direction of the first skew step 162a, and the q1-axis defined in the direction advanced to the d1-axis by 90 degrees in the electrical angle.

<Phase Change of Current Vector in Maximum Torque/Current Control>

Figure 21:
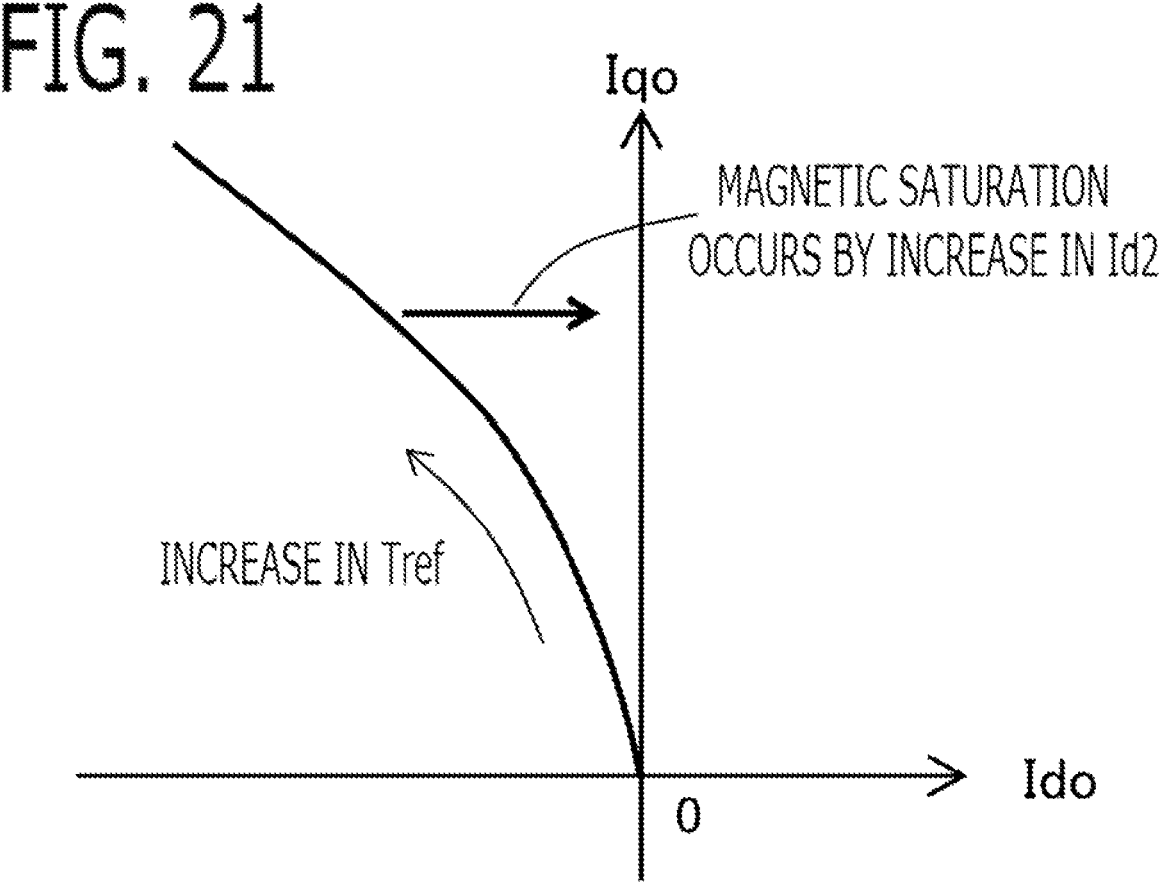
FIG. 21 is a figure explaining setting of the current command values by the maximum torque/current control according to Embodiment 4.

In this kind embedded magnet type synchronous motor, the q-axis inductance Lq becomes larger than the d-axis inductance Ld, and generally the current command values are set by the maximum torque/current control. In the maximum torque/current control, as shown in FIG. 21, the current command values of d-axis and q-axis Ido, Iqo which maximize the generated torque to the same current is calculated. As the torque command value Tref increases, along the maximum torque/current curve, the current command value of q-axis Iqo is increased from 0, and the current command value of d-axis Ido is decreased from 0.

Also in this kind embedded magnet type synchronous motor, if d2-axis current Id2 which expressed currents on the dq-axis rotating coordinate system of most advanced phase increases from the current command value of d-axis calculated by the maximum torque/current control on the dq-axis rotating coordinate system of most advanced phase, to the positive direction, similarly to FIG. 9 of Embodiment 1, the magnetic saturation occurs and the sixth-order torque ripple component in the electrical angle increases. Accordingly, even if the absolute value |I| of the current vector increases, if the d2-axis current Id2 can be maintained around the current command value of d-axis Ido calculated by the maximum torque/current control on the dq-axis rotating coordinate system of most advanced phase, occurrence of the magnetic saturation can be suppressed and occurrence of the sixth-order torque ripple component can be suppressed. Accordingly, similarly to FIG. 7 of Embodiment 1, in order to maintain the d2-axis current Id2 around the current command value of d-axis Ido calculated by the maximum torque/current control, as the absolute value |I| of the current vector increases, the phase advance α of the magnetic pole position for control θc with respect to the magnetic pole position θ1 of the most delayed phase may be brought close to the skew angle θe corresponding to the magnetic pole position θ2 of the most advanced phase, from the skew angle θe/2 corresponding to the middle phase between the magnetic pole position θ1 of the most delayed phase and the magnetic pole position θ2 of the most advanced phase.

Figure 22:
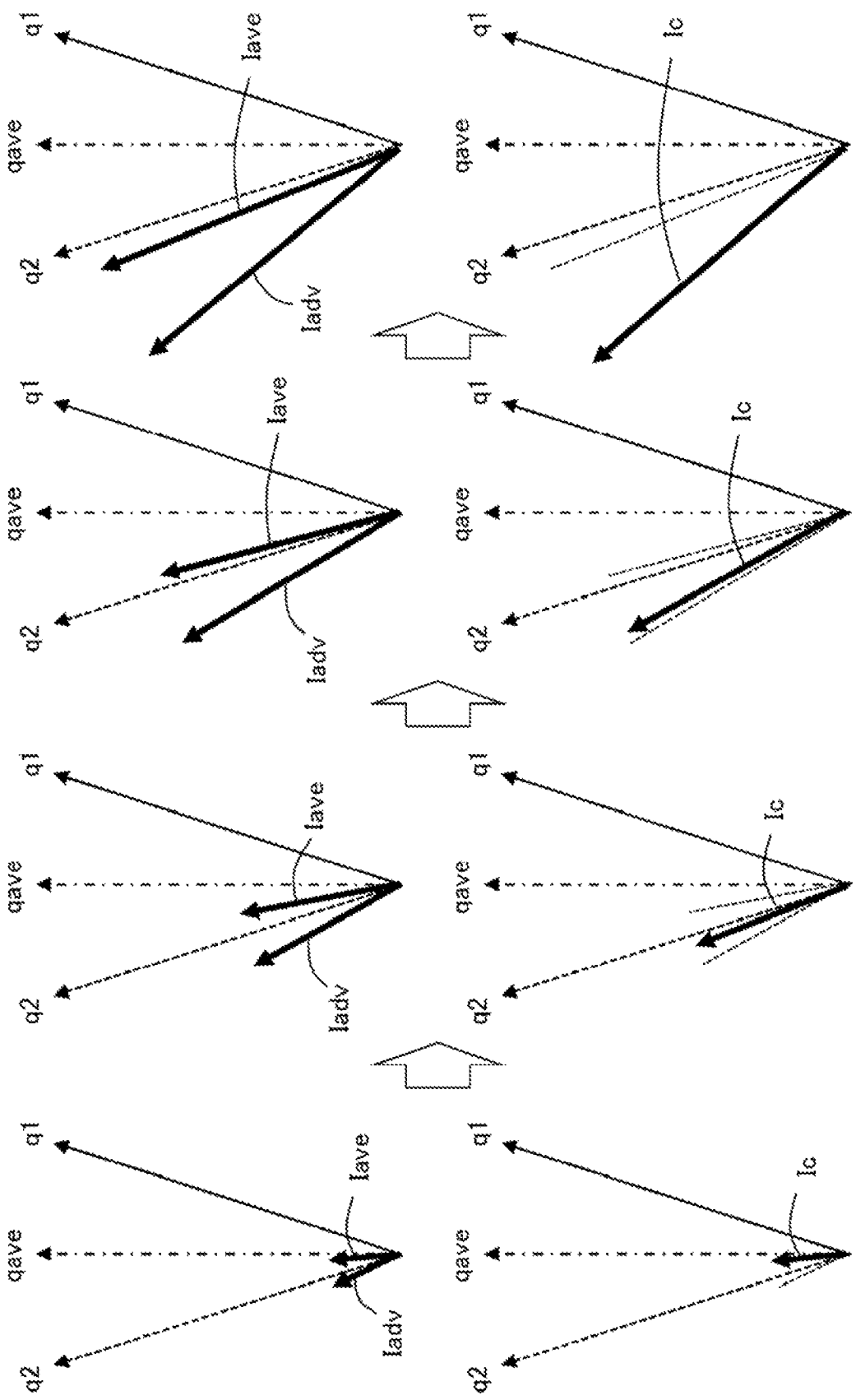
FIG. 22 is a figure explaining control of the current vector in the case of the maximum torque/current control according to Embodiment 4.

Then, when defining, as the current vector of most advanced phase Iadv, a current vector of the current command values calculated by the maximum torque/current control on the dq-axis rotating coordinate system of most advanced phase, and defining, as the current vector of middle phase Iave, a current vector of the current command values calculated by the maximum torque/current control on the dq-axis rotating coordinate system of middle phase, as shown in FIG. 22, the current control unit 33 brings the controlling current vector Ic close to the current vector of most advanced phase Iadv from the current vector of middle phase Iave, as the winding currents which flow into the three-phase windings increase.

According to this configuration, since the d2-axis current Id2 which expressed currents on the dq-axis rotating coordinate system of most advanced phase can be maintained around the current command value of d-axis calculated by the maximum torque/current control on the dq-axis rotating coordinate system of most advanced phase, occurrence of the magnetic saturation can be suppressed, and occurrence of the sixth-order torque ripple component can be suppressed.

<If Method Similar to Embodiment 1 is Used>

As the winding currents increase, the magnetic pole position setting unit 331 brings the magnetic pole position for control θc close to the magnetic pole position θ2 whose phase is most advanced in the rotation direction, from the magnetic pole position θave of the middle phase between the magnetic pole position θ2 of the second skew step 112b whose phase is most advanced in the rotation direction and the magnetic pole position θ1 of the first skew step 112a whose phase is most delayed. Then, the current command value calculation unit 332 calculates the current command values for control by the maximum torque/current control, on the dq-axis rotating coordinate system for control which is set on the basis of the magnetic pole position for control θc. Then, the voltage command value calculation unit 333 calculates the voltage command values based on the detection values of currents and the current command values for control, on the dq-axis rotating coordinate system for control which is set on the basis of the magnetic pole position for control θc.

Unlike Embodiment 1, the current command value calculation unit 332 calculates the current command values of d-axis and q-axis Ido, Iqo for control by the maximum torque/current control, on the dq-axis rotating coordinate system for control. For example, by referring to a current command value setting data in which a relationship between the torque command value Tref and the current command values of d-axis and q-axis Ido, Iqo is preliminarily set as shown in FIG. 21, the current command value calculation unit 332 calculates the current command values of d-axis and q-axis Ido, Iqo for control corresponding to the present torque command value Tref. Since other points are the same as Embodiment 1, explanation is omitted.

<If Method Similar to Embodiment 2 is Used>

The magnetic pole position setting unit 331 sets, as the magnetic pole position for control θc, the magnetic pole position θave of the middle phase between the magnetic pole position θ2 of the second skew step 112b whose phase is most advanced and the magnetic pole position θ1 of the first skew step 112a whose phase is most delayed in the rotation direction. The current command value calculation unit 332 calculates the current command values by the maximum torque/current control, on the dq-axis rotating coordinate system of middle phase which is set on the basis of the magnetic pole position θave of the middle phase; and calculates the current command values for control by decreasing the d-axis component of the current command values by the d-axis current decrease amount ΔId. As the winding currents increase, the current command value calculation unit 332 increases the d-axis current decrease amount ΔId so that the current vector Ic of the current command values for control approaches the current vector of most advanced phase Iadv from the current vector of middle phase Iave. Then, the voltage command value calculation unit 333 calculates the voltage command values based on the detection values of currents and the current command values for control, on the dq-axis rotating coordinate system of middle phase which is set on the basis of the magnetic pole position θave of the middle phase.

Unlike Embodiment 2, the current command value calculation unit 332 calculates the current command values of d-axis and q-axis Idave, Iqave of the middle phase by the maximum torque/current control, on the dq-axis rotating coordinate system of middle phase. For example, by referring to the current command value setting data in which a relationship between the torque command value Tref and the current command values of d-axis and q-axis Ido, Iqo is preliminarily set as shown in FIG. 21, the current command value calculation unit 332 calculates the current command values of d-axis and q-axis Idave, Iqave of the middle phase corresponding to the present torque command value Tref.

Then, as shown in the equation (8), the current command value calculation unit 332 calculates the current command value of d-axis Ido for control by decreasing the current command value of d-axis Idave of the middle phase by the d-axis current decrease amount ΔId. The current command value calculation unit 332 sets the current command value of q-axis Iqave of the middle phase as the current command value of q-axis Iqo for control as it is.

By referring to the decrease amount setting data in which a relationship between the winding current |I| and the d-axis current decrease amount ΔId is preliminarily set similar to FIG. 14, the current command value calculation unit 332 calculates the d-axis current decrease amount ΔId corresponding to the present winding current |I|. In the decrease amount setting data, the d-axis current decrease amount ΔId is increased so that the current vector Ic of the current command values for control approaches the current vector of most advanced phase Iadv from the current vector of middle phase Iave the as winding current |I| increases. The current command value calculation unit 332 calculates, as the winding current |I|, an absolute value of current vector based on the current command value of d-axis Idave and the current command value of q-axis Iqave of the middle phase, as shown in the equation (10).

When the winding current |I| exceeds a threshold value Ith which is set to a value smaller than the upper limit current value Imax, the current command value calculation unit 332 brings the current vector Ic of the current command values for control close to the current vector of middle phase Iave from the current vector of most advanced phase Iadv, as the winding current |I| approaches the upper limit current value Imax. In the present embodiment, similarly to FIG. 14, when the winding current |I| exceeds the threshold value Ith, the current command value calculation unit 332 decreases the d-axis current decrease amount ΔId to 0, as the winding current |I| approaches the upper limit current value Imax.

5. Embodiment 5

The rotary electric machine apparatus according to Embodiment 5 will be explained. The explanation for constituent parts the same as those in each of Embodiments 1, 2, or 4 will be omitted. The basic configuration of the rotary electric machine 1, the inverter 4, and the controller 6 according to the present embodiment is the same as that of Embodiment 1, 2, or 4. The magnetic flux weakening control is performed in addition to the Id=0 control or the maximum torque/current control, and the calculation method of the current command values is different from Embodiments 1, 2 or 4.

In the magnetic flux weakening control, the current command value of d-axis is increased in the negative direction from the current command values of d-axis and q-axis calculated by the Id=0 control or the maximum torque/current control, and the magnetic flux of the permanent magnet is weakened. The execution region of the magnetic flux weakening control is set to a region where the induced voltage of the windings becomes close to the upper limit voltage corresponding to the power source voltage Vdc. If the current command value of d-axis is increased in the negative direction and the magnetic flux of the permanent magnet is weakened, the induced voltage of the winding can be weakened and the torque of the rotary electric machine can be increased.

Figure 23:
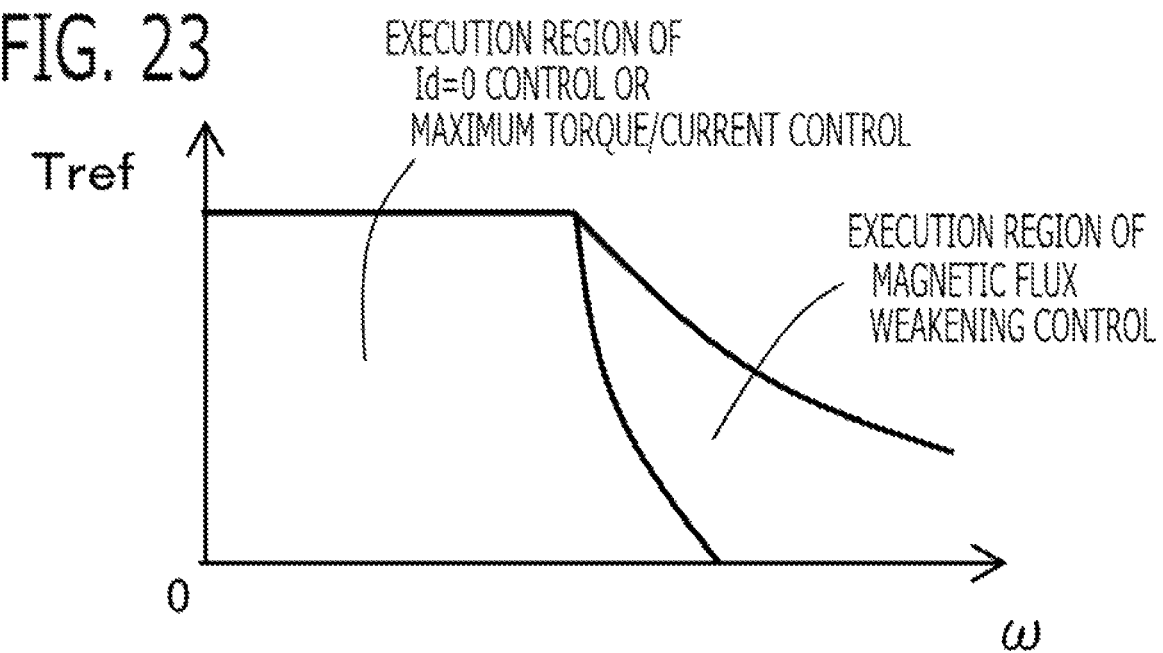
FIG. 23 is a figure explaining the execution region of the magnetic flux weakening control according to Embodiment 5.

By referring to an execution region setting data in which a relationship among the rotational angle speed ω, the torque command value Tref, and the execution region of each control is preliminarily set as shown in FIG. 23, the current control unit 33 determines the execution region of control corresponding to the present rotational angle speed ω and the present torque command value Tref.

When determining that the execution region is the execution region of the Id=0 control, or the execution region of the maximum torque/current control, similarly to Embodiments 1, 2, or 4, when defining, as the current vector of most advanced phase Iadv, a current vector of the current command values calculated by the Id=0 control or the maximum torque/current control on the dq-axis rotating coordinate system of most advanced phase, and defining, as the current vector of middle phase Iave, a current vector of the current command values calculated by the Id=0 control or the maximum torque/current control on the dq-axis rotating coordinate system of middle phase, the current control unit 33 brings the controlling current vector Ic close to the current vector of most advanced phase Iadv from the current vector of middle phase Iave, as the winding currents which flow into the three-phase windings increase.

On the other hand, when determining that the execution region is the execution region of the magnetic flux weakening control, when defining, as the current vector of most advanced phase Iadv, a current vector of the current command values calculated by the magnetic flux weakening control on the dq-axis rotating coordinate system of most advanced phase, and defining, as the current vector of middle phase Iave, a current vector of the current command values calculated by the magnetic flux weakening control on the dq-axis rotating coordinate system of middle phase, the current control unit 33 brings the controlling current vector Ic close to the current vector of most advanced phase Iadv from the current vector of middle phase Iave, as the winding currents which flow into the three-phase windings increase.

<If Method Similar to Embodiment 1 is Used>

The case where a method similar to Embodiment 1 is used is explained. As the winding currents increase, the magnetic pole position setting unit 331 brings the magnetic pole position for control θc close to the magnetic pole position θ2 of the most advanced phase in the rotation direction, from the magnetic pole position θave of the middle phase. Then, the current command value calculation unit 332 calculates the current command values for control by the magnetic flux weakening control, on the dq-axis rotating coordinate system for control which is set on the basis of the magnetic pole position for control θc. Then, the voltage command value calculation unit 333 calculates the voltage command values based on the detection values of currents and the current command values for control, on the dq-axis rotating coordinate system for control which is set on the basis of the magnetic pole position for control θc.

The current command value calculation unit 332 calculates the current command values of d-axis and q-axis Ido, Iqo for control by the magnetic flux weakening control, on the dq-axis rotating coordinate system for control. For example, the current command value calculation unit 332 calculates an effective value Vamp of interphase voltages applied to the windings, and increases and decreases the current command value of d-axis Ido so that the effective value Vamp of interphase voltages approach a target effective value Vampo.

The case where the current command value of d-axis is increased in the negative direction by the magnetic flux weakening control, from the current command values of d-axis and q-axis calculated by the Id=0 control will be explained. The current command value calculation unit 332 calculates the effective value Vamp of interphase voltages, based on the voltage command values of dq-axis Vdo, Vqo of the last time calculation period using the next equation. The current command value calculation unit 332 sets the target effective value Vampo based on the power source voltage Vdc.

$$Vamp=\sqrt{(Vdo^2+Vqo^2)}$$

$$Vampo=Vdc/\sqrt{(2)} \qquad (11)$$

Then, as shown in the next equation, the current command value calculation unit 332 calculates a deviation ΔVamp between the effective value Vamp of interphase voltages and the target effective value Vampo, and calculates the current command value of d-axis Ido for control by integrating the deviation ΔVamp. In the integral calculation, the current command value calculation unit 332 upper-limits the current command value of d-axis Ido for control by 0 in the case of the Id=0 control, and calculates the current command value of d-axis Ido for control which is less than or equal to 0. Herein, Ki is an integral gain. The current command value calculation unit 332 calculates the current command value of q-axis Iqo for control similarly to the Id=0 control.

$$\Delta Vamp=Vampo-Vamp$$

$$Ido=\int Ki\times\Delta Vamp$$

$$Ido<=0 \qquad (12)$$

$$Iqo=Kt\times Tref$$

If the current command value of d-axis is increased in the negative direction by the magnetic flux weakening control, from the current command values of d-axis and q-axis calculated by the maximum torque/current control, the current command value of q-axis Iqo for control is also changed so that the same torque can be maintained. In the integral calculation, the current command value of d-axis Ido for control is upper-limited by the current command value of d-axis in the case of the maximum torque/current control.

<If Method Similar to Embodiment 2 is Used>

The magnetic pole position setting unit 331 sets the magnetic pole position θave of the middle phase as the magnetic pole position for control θc. The current command value calculation unit 332 calculates the current command values by the magnetic flux weakening control, on the dq-axis rotating coordinate system of middle phase which is set on the basis of the magnetic pole position θave of the middle phase; and calculates the current command values for control by decreasing the d-axis component of the current command values by the d-axis current decrease amount ΔId. As the winding currents increase, the current command value calculation unit 332 increases the d-axis current decrease amount ΔId so that the current vector Ic of the current command values for control approaches the current vector of most advanced phase Iadv calculated by the magnetic flux weakening control, from the current vector of middle phase Iave calculated by the magnetic flux weakening control. Then, the voltage command value calculation unit 333 calculates the voltage command values based on the detection values of currents and the current command values for control, on the dq-axis rotating coordinate system of middle phase which is set on the basis of the magnetic pole position θave of the middle phase.

The case where the current command value of d-axis is increased in the negative direction by the magnetic flux weakening control, from the current command values of d-axis and q-axis calculated by the Id=0 control will be explained. The current command value calculation unit 332 calculates the effective value Vamp of interphase voltages, and the target effective value Vampo, similarly to the above equation (11).

Then, as shown in the next equation, the current command value calculation unit 332 calculates a deviation ΔVamp between the effective value Vamp of interphase voltages and the target effective value Vampo, and calculates the current command value of d-axis Idave of the middle phase by integrating the deviation ΔVamp. In the integral calculation, the current command value calculation unit 332 upper-limits the current command value of d-axis Idave of the middle phase by 0 in the case of the Id=0 control, and calculates the current command value of d-axis Idave of the middle phase which is less than or equal to 0. The current command value calculation unit 332 calculates the current command value of q-axis Iqave of the middle phase, similarly to the Id=0 control.

$$\Delta Vamp=Vampo-Vamp$$

$$Idave=\int Ki\times\Delta Vamp$$

$$Idave<=0 \qquad (13)$$

$$Iqave=Kt\times Tref$$

If the current command value of d-axis is increased in the negative direction by the magnetic flux weakening control, from the current command values of d-axis and q-axis calculated by the maximum torque/current control, the current command value of q-axis Iqave of the middle phase is also changed so that the same torque can be maintained. In the integral calculation, the current command value of d-axis Idave of the middle phase is upper-limited by the current command value of d-axis in the case of the maximum torque/current control.

Then, as shown in the next equation, the current command value calculation unit 332 calculates the current command value of d-axis Ido for control by decreasing the current command value of d-axis Idave of the middle phase by the d-axis current decrease amount ΔId. The current command value calculation unit 332 sets the current command value of q-axis Iqave of the middle phase as the current command value of q-axis Iqo for control as it is. The d-axis current decrease amount ΔId is set similarly to Embodiment 1.

$$Ido=Idave-\Delta Id$$

$$Iqo=Iqave \qquad (14)$$

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

(1) In above-mentioned Embodiment 3, there was explained the case where the rotary electric machine is used for the driving force source of the electric power steering apparatus. However, the rotary electric machine may be used for various kinds of applications, such as being used for a power device of wheels.

Figure 24:
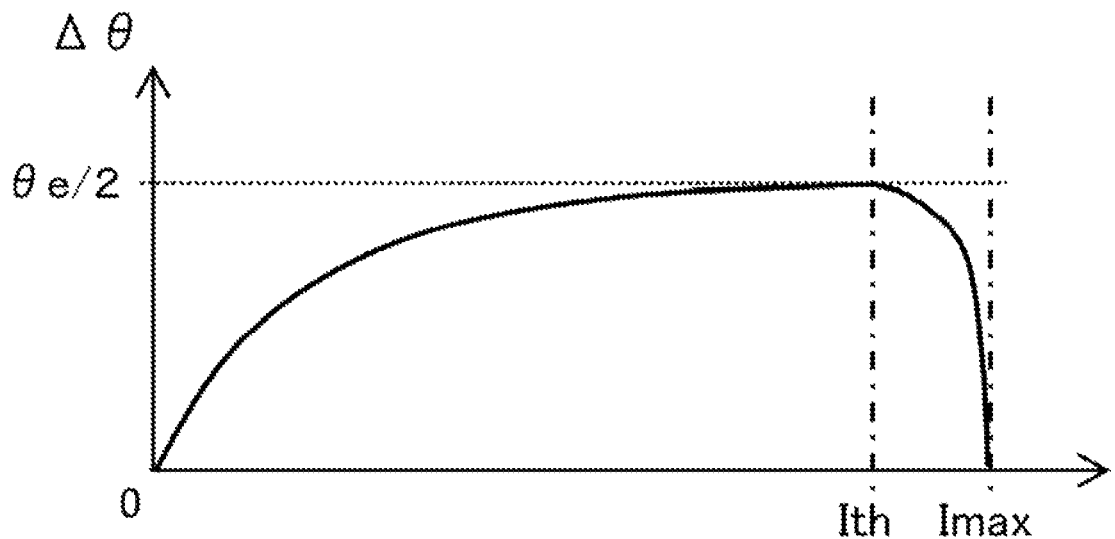
FIG. 24 is a figure explaining setting of the correction amount of magnetic pole position according to the current according to other embodiments.

(2) In above-mentioned Embodiment 1, when the winding current |I| exceeds the threshold value Ith which is set to a value smaller than the upper limit current value Imax, the current command value calculation unit 332 may bring the current vector Ic of the current command values for control close to the current vector of middle phase Iave from the current vector of most advanced phase Iadv, as the winding current |I| approaches the upper limit current value Imax. When the winding current |I| exceeds the threshold value Ith, the current command value calculation unit 332 brings the magnetic pole position for control θc close to the magnetic pole position θave of the middle phase, as the winding current |I| approaches the upper limit current value Imax. Specifically, as shown in FIG. 24, when the winding current |I| exceeds the threshold value Ith, the current command value calculation unit 332 brings the correction amount of magnetic pole position Δθ close to 0 from the skew angle θe/2, as the winding current |I| approaches the upper limit current value Imax.

The current command value calculation unit 332 calculates the component of the qave-axis which expressed the winding current |I| on the dq-axis rotating coordinate system of middle phase, as the winding current |I|, as shown in the next equation.

$$|I| = \sqrt{(Ido^2 + Iqo^2)} \times \sin(\Delta\theta) \quad (15)$$

In the rotary electric machine in which the reduction of the sixth-order torque ripple component is required more than the increase in the maximum torque, this processing may not be performed.

(3) In each of the above-mentioned embodiments, there was explained the case where the permanent magnets have the skew structure in which the magnetic pole positions are shifted in the circumferential direction in two steps in the axial direction X. However, the permanent magnet may have a skew structure in which the magnetic pole positions are shifted in the circumferential direction in three or more steps in the axial direction X or continuously in the axial direction X.

Figure 25:
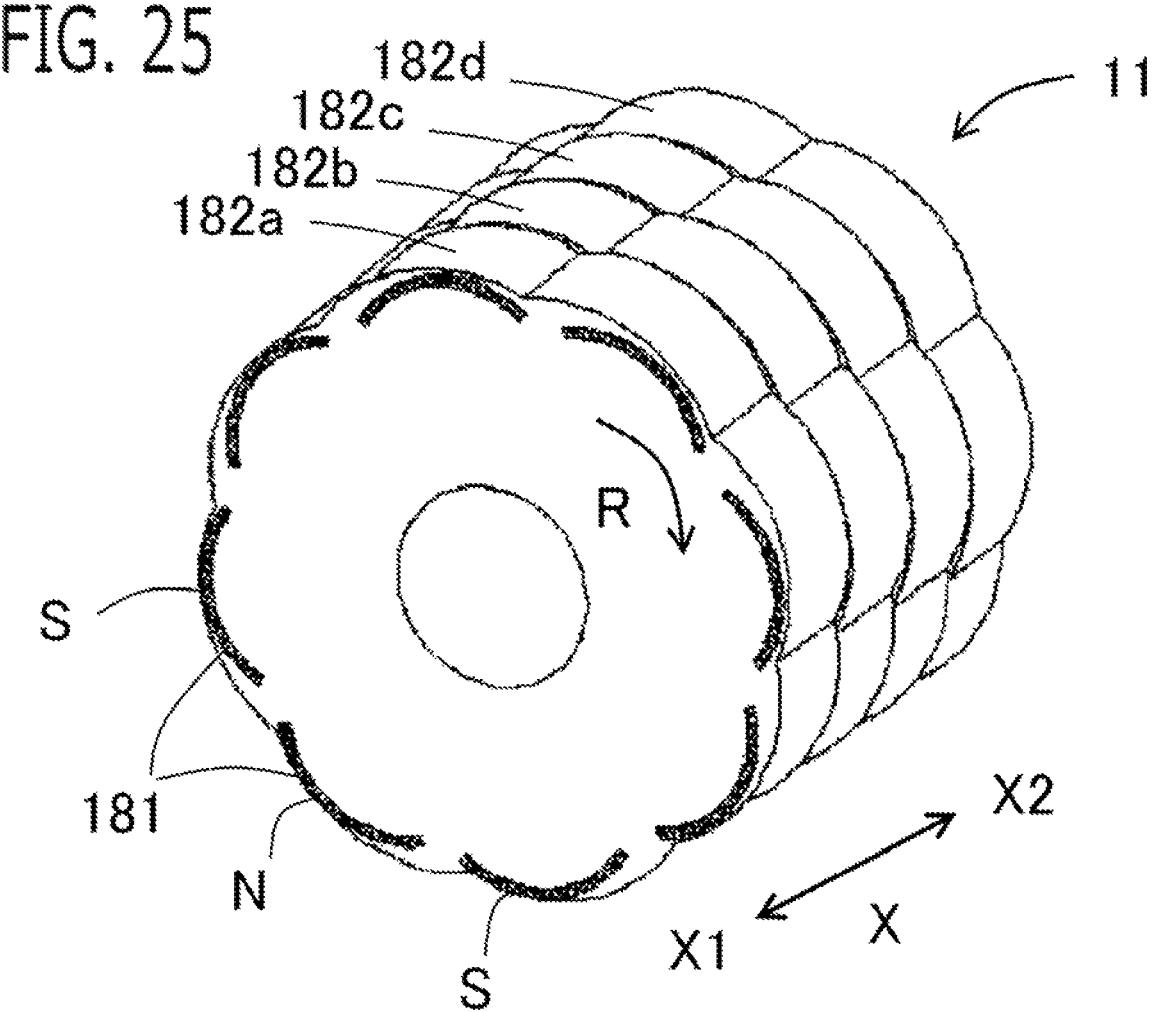
FIG. 25 is a perspective view of the rotor according to other embodiments.

For example, as shown in FIG. 25, the permanent magnets may have the skew structure in which the magnetic pole positions are shifted in the circumferential direction in four steps in the axial direction X. From the axial direction one side X1 to the axial direction the other side X2, in order, the first skew step 182a, the second skew step 182b, the third skew step 182c, and the fourth skew step 182d are provided, and each magnetic pole position is shifted in the rotation direction R by 15 degrees in the electrical angle. In the peripheral part of each skew step, eight magnetic poles 181 (four N poles and four S poles) are disposed at equal intervals in the circumferential direction, and are embedded inside of the rotor 11.

The magnetic pole (N pole) of the fourth skew step 182d whose phase is most advanced in the rotation direction R is shifted to the magnetic pole (N pole) of the first skew step 182a whose phase is most delayed in the rotation direction R, by the skew angle θe (in this example, 60 degrees) in the electrical angle.

In this case, the dq-axis rotating coordinate system of most advanced phase is set to the d-axis defined in the magnetic pole position direction of the fourth skew step 182d whose phase is most advanced in the rotation direction R, and the q-axis defined in the direction advanced to the d-axis by 90 degrees in the electrical angle. The dq-axis rotating coordinate system of middle phase is set to the d-axis defined in the direction of the middle phase between the magnetic pole position of the fourth skew step 182d whose phase is most advanced and the magnetic pole position of the first skew step 182a whose phase is most delayed in the rotation direction R, and the q-axis defined in the direction advanced to the d-axis by 90 degrees in the electrical angle.

Figure 26:
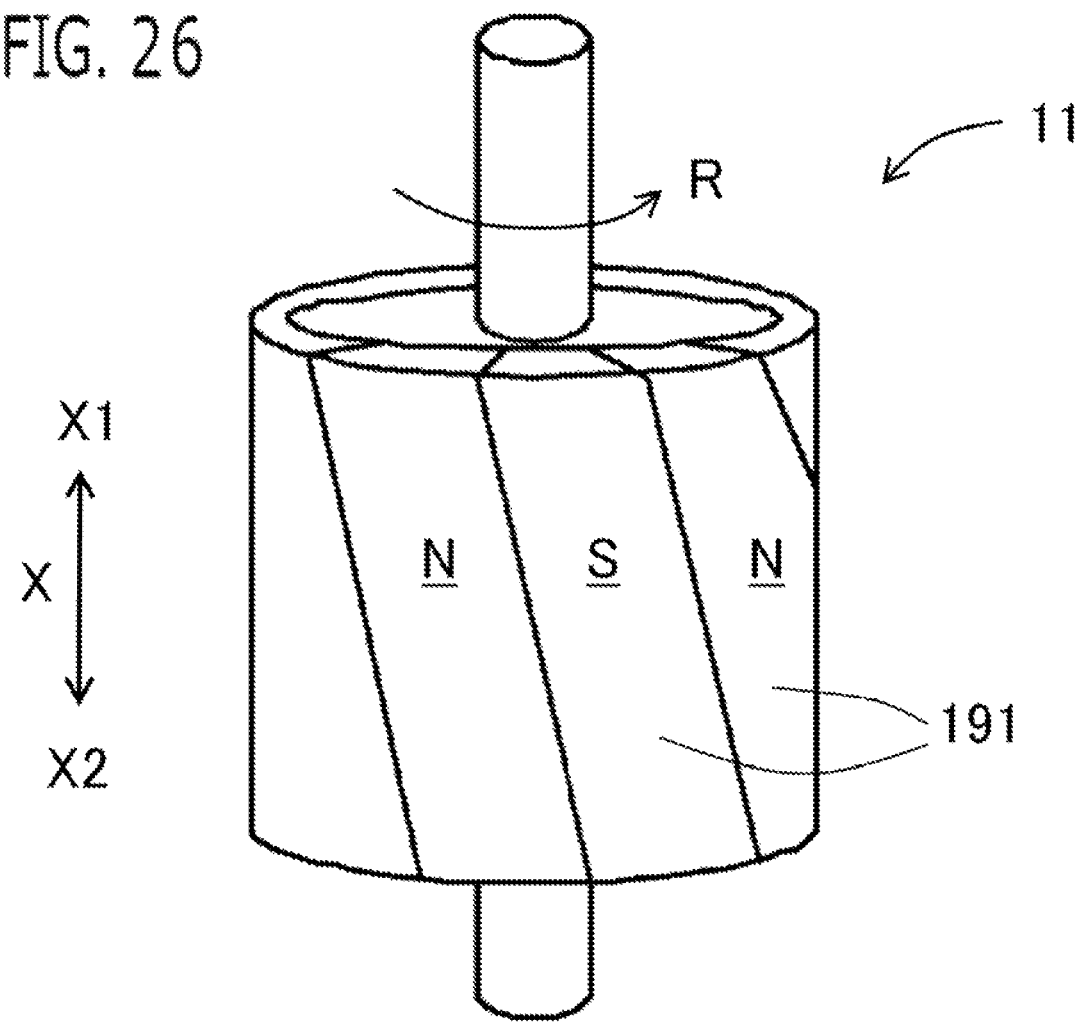
FIG. 26 is a perspective view of the rotor according to other embodiments.

Alternatively, as shown in FIG. 26, the permanent magnets may have the skew structure in which the magnetic pole positions are shifted in the circumferential direction continuously in the axial direction X. In the peripheral part of the rotor, eight magnetic poles 191 (four N poles and four S poles) are disposed at equal intervals in the circumferential direction, and are stuck on the surface of the rotor. From the axial direction one side X1 to the axial direction the other side X2, each magnetic pole 191 is continuously shifted in the rotation direction R.

Figure 27:
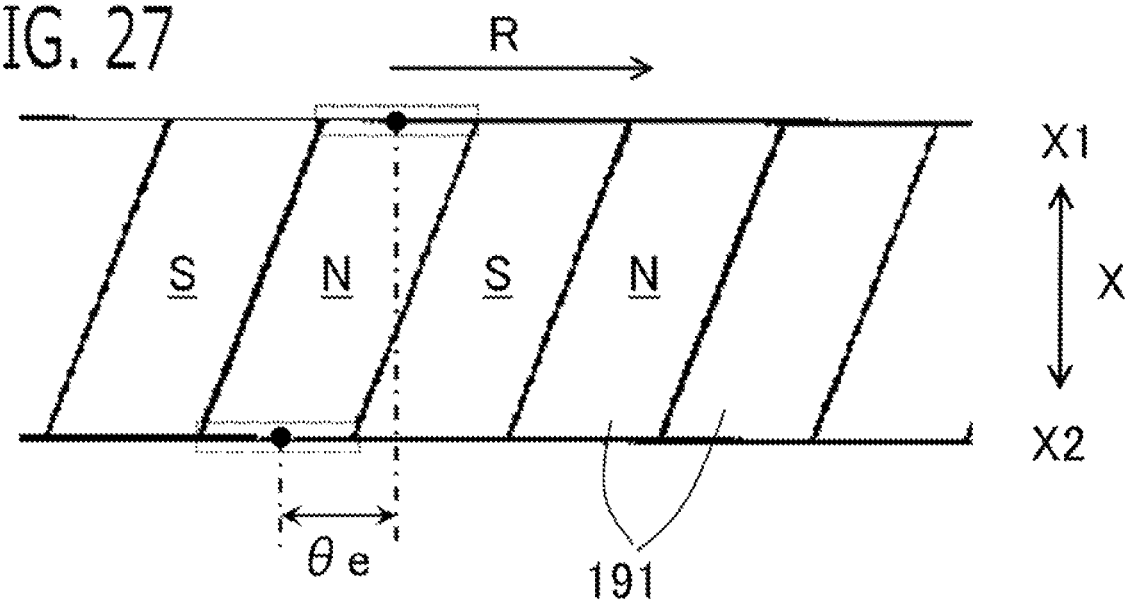
FIG. 27 is an expansion plan of the rotor according to other embodiments.

As FIG. 27 shows an expansion plan, the magnetic pole (N pole) of the end in the axial direction one side X1 whose phase is most advanced in the rotation direction R is shifted to the magnetic pole (N pole) of the end in the axial direction the other side X2 whose phase is most delayed in the rotation direction R, by the skew angle θe (in this example, 60 degrees) in the electrical angle.

In this case, the dq-axis rotating coordinate system of most advanced phase is set to the d-axis defined in the magnetic pole position direction of the end in the axial direction one side X1 whose phase is most advanced in the rotation direction R, and the q-axis defined in the direction advanced to the d-axis by 90 degrees in the electrical angle. The dq-axis rotating coordinate system of middle phase is set to the d-axis defined in the direction of the middle phase between the magnetic pole position of the end in the axial direction one side X1 whose phase is most advanced and the magnetic pole position of the end in the axial direction the other side X2 whose phase is most delayed in the rotation direction R, and the q-axis defined in the direction advanced to the d-axis by 90 degrees in the electrical angle.

Alternatively, as FIG. 28 shows an expansion plan, the skew structure in which the magnetic pole positions are shifted in the circumferential direction continuously in the axial direction X may be approximated to the skew structure in which the magnetic pole positions are shifted in the circumferential direction in two steps in the axial direction X. The magnetic pole position of the skew step 192a of the axial direction one side X1 is set to a center position in the circumferential direction of the half magnetic pole of the axial direction one side X1, and the magnetic pole position of the skew step 192b of the axial direction the other side X2 is set to a center position in the circumferential direction of the half magnetic pole of the axial direction the other side X2.

The dq-axis rotating coordinate system of most advanced phase is set to the d-axis defined in the magnetic pole position direction of the skew step 192b of the axial direction the other side X2 whose phase is most advanced in the rotation direction R, and the q-axis defined in the direction advanced to the d-axis by 90 degrees in the electrical angle. The dq-axis rotating coordinate system of middle phase is set to the d-axis defined in the direction of the middle phase between the magnetic pole position of the skew step 192b of the axial direction the other side X2 whose phase is most advanced and the magnetic pole position of the skew step 192a of the axial direction one side X1 whose phase is most delayed in the rotation direction R, and the q-axis defined in the direction advanced to the d-axis by 90 degrees in the electrical angle.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Rotary Electric Machine, 3 DC power Source, 4 Inverter, 6 Controller, 31 Rotation Detection Unit, 32 Current Detection Unit, 33 Current Control Unit, 34 Switching Control Unit, Iadv Current vector of most advanced phase, Iave Current vector of middle phase, Ic Current vector of current command values for control, Ido Current command value of d-axis for control, Iqo Current command value of q-axis for control, Idave Current command value of d-axis of middle phase, Iqave Current command value of q-axis of middle phase, Idr Current detection value of d-axis for control, Iqr Current detection value of q-axis for control, Imax Upper limit current value, Ith Threshold value, R Rotation direction, R1 Rotation direction of one side, R2 Rotation direction of the other side, Vdo Voltage command value of d-axis for control, Vqo Voltage command value of q-axis for control, ΔId d-axis current decrease amount, θ1 Magnetic pole position of most delayed phase, θ2 Magnetic pole position of most advanced phase, θave Magnetic pole position of middle phase, θc Magnetic pole position for control, θe Skew angle

What is claimed is:

1. A rotary electric machine apparatus comprising:
   a rotary electric machine that is provided with a rotor having permanent magnets, and a stator having plural-phase windings;
   an inverter that converts DC power supplied from a DC power source and AC power supplied to the plural-phase windings, and is provided with a plurality of switching devices;
   a current detector that detects currents which flow into the plural-phase windings;
   a rotation detector that detects a rotational angle of the rotor;
   a current controller that sets a magnetic pole position for control based on a detection value of the rotational angle, calculates current command values for control, and calculates voltage command values based on detection values of the currents, the current command values for control, and the magnetic pole position for control; and
   a switching controller that controls on/off the plurality of switching devices based on the voltage command values,
   wherein the permanent magnets have a skew structure in which the magnetic pole positions are shifted in the circumferential direction at each position in an axial direction,
   wherein when defining, as a current vector of most advanced phase, a current vector of the current command values calculated on a dq-axis rotating coordinate system of most advanced phase which consists of a d-axis defined in a direction of the magnetic pole position whose phase is most advanced in a rotation direction among the magnetic pole positions of respective positions in the axial direction, and a q-axis defined in a direction advanced to this d-axis by 90 degrees in an electrical angle, and
   defining, as a current vector of middle phase, a current vector of the current command values calculated on a dq-axis rotating coordinate system of middle phase which consists of a d-axis defined in a direction of a middle phase between the magnetic pole position whose phase is most advanced and the magnetic pole position whose phase is most delayed in the rotation direction among the magnetic pole positions of respective positions in the axial direction, and a q-axis defined in a direction advanced to this d-axis by 90 degrees in an electrical angle,
   the current controller brings a controlling current vector close to the current vector of most advanced phase from the current vector of middle phase, as winding currents flowing into the plurality of windings increase.

2. The rotary electric machine apparatus according to claim 1,
   wherein as the winding currents increase, the current controller brings the magnetic pole position for control close to the magnetic pole position whose phase is most advanced in the rotation direction, from a magnetic pole position of the middle phase between the magnetic pole position whose phase is most advanced and the magnetic pole position whose phase is most delayed in the rotation direction;
   calculates the current command values for control on a dq-axis rotating coordinate system for control which is set on a basis of the magnetic pole position for control; and
   calculates the voltage command values based on the detection values of currents and the current command values for control.

3. The rotary electric machine apparatus according to claim 1,
   wherein the current controller sets, as the magnetic pole position for control, a magnetic pole position of the middle phase between the magnetic pole position whose phase is most advanced and the magnetic pole position whose phase is most delayed in the rotation direction;
   calculates current command values on the dq-axis rotating coordinate system of middle phase which is set on a basis of the magnetic pole position of the middle phase;

calculates the current command values for control by decreasing a d-axis component of the current command values by a d-axis current decrease amount;

makes the d-axis current decrease amount increase so that a current vector of the current command values for control approaches the current vector of most advanced phase from the current vector of middle phase, as the winding currents increase; and calculates the voltage command values based on the detection values of currents and the current command values for control, on the dq-axis rotating coordinate system of middle phase.

4. The rotary electric machine apparatus according to claim 1, wherein when the winding currents exceed a threshold value which is set to a value smaller than an upper limit current value, the current controller brings a current vector of the current command values for control close to the current vector of middle phase from the current vector of most advanced phase, as the winding currents approach the upper limit current value.

5. The rotary electric machine apparatus according to claim 1, wherein the rotary electric machine is rotatable to one side and the other side, and wherein the current controller sets the magnetic pole position whose phase is most advanced and the magnetic pole position whose phase is most delayed in the rotation direction, according to the rotation direction of one side or the other side.

6. The rotary electric machine apparatus according to claim 5, wherein the rotary electric machine is used for a driving force source of an electric power steering apparatus.

7. The rotary electric machine apparatus according to claim 1, wherein the permanent magnets are provided on a surface of the rotor, and wherein when defining, as the current vector of most advanced phase, a current vector of current command values calculated by Id=0 control on the dq-axis rotating coordinate system of most advanced phase, and defining, as the current vector of middle phase, a current vector of current command values calculated by the Id=0 control on the dq-axis rotating coordinate system of middle phase, the current controller brings the controlling current vector close to the current vector of most advanced phase from the current vector of middle phase, as the winding currents increase.

8. The rotary electric machine apparatus according to claim 1, wherein the permanent magnets are embedded inside of the rotor, and wherein when defining, as the current vector of most advanced phase, a current vector of current command values calculated by a maximum torque/current control on the dq-axis rotating coordinate system of most advanced phase, and defining, as the current vector of middle phase, a current vector of current command values calculated by the maximum torque/current control on the dq-axis rotating coordinate system of middle phase, the current controller brings the controlling current vector close to the current vector of most advanced phase from the current vector of middle phase, as the winding currents increase.

9. The rotary electric machine apparatus according to claim 1, wherein when, in an execution region of a magnetic flux weakening control, defining, as the current vector of most advanced phase, a current vector of current command values calculated by the magnetic flux weakening control on the dq-axis rotating coordinate system of most advanced phase, and defining, as the current vector of middle phase, a current vector of current command values calculated by the magnetic flux weakening control on the dq-axis rotating coordinate system of middle phase, the current controller brings the controlling current vector close to the current vector of most advanced phase from the current vector of middle phase, as the winding currents increase.

10. The rotary electric machine apparatus according to claim 1, wherein a pole number of the permanent magnets provided in the rotor is 8, and a slot number of the stator around which the plural-phase windings are wound is 12.

11. The rotary electric machine apparatus according to claim 1, wherein the permanent magnets have the skew structure in which the magnetic pole positions are shifted in the circumferential direction in two steps in the axial direction.

* * * * *